(12) United States Patent
Karaoguz

(10) Patent No.: US 8,774,070 B2
(45) Date of Patent: Jul. 8, 2014

(54) POSITION BASED WPAN (WIRELESS PERSONAL AREA NETWORK) MANAGEMENT

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 436 days.

(21) Appl. No.: 12/694,863

(22) Filed: Jan. 27, 2010

(65) Prior Publication Data

US 2010/0124214 A1 May 20, 2010

Related U.S. Application Data

(63) Continuation of application No. 10/668,527, filed on Sep. 23, 2003, now Pat. No. 7,668,124.

(60) Provisional application No. 60/472,336, filed on May 21, 2003.

(51) Int. Cl.
*H04B 7/00* (2006.01)
*H04L 12/28* (2006.01)

(52) U.S. Cl.
USPC ............... 370/310; 370/310.1; 370/310.2; 370/315; 370/254; 370/255; 370/351; 370/352

(58) Field of Classification Search
USPC .......... 370/254, 255, 310, 310.1, 310.2, 315, 370/328, 351, 352
See application file for complete search history.

(56) References Cited

U.S. PATENT DOCUMENTS 6,683,568 B1 * 1/2004 James et al. ............. 342/387
6,731,242 B1 * 5/2004 Rapeli ..................... 342/450
6,970,703 B2 * 11/2005 Fuchs et al. .............. 455/426.1
7,039,392 B2 * 5/2006 McCorkle et al. .......... 455/411
7,254,615 B2 * 8/2007 Taib et al. ................. 709/209
7,898,977 B2 * 3/2011 Roese et al. ................ 370/254
2006/0158329 A1 * 7/2006 Burkley et al. ............ 340/539.13

OTHER PUBLICATIONS

Bluetooth—Connect Without Cables; Pub. 2011, XP2471968, 24 pages.
European Search Report for EP Application No./Patent No. 04003649.3-1249, dated Feb. 2, 2011.

* cited by examiner

*Primary Examiner* — Ayaz Sheikh
*Assistant Examiner* — Blanche Wong
(74) *Attorney, Agent, or Firm* — Garlick & Markison; Shayne X. Short

(57) ABSTRACT

Position based WPAN (Wireless Personal Area Network) management. Based on either the relative position or the specific location of devices within a WPAN, communication between the various devices is managed by grouping the devices into two or more groups. In addition, the communication between theses various devices may be governed by profiles assigned to the groups (or even the actual individual devices) that are assigned based on their locations within the WPAN. The relative locations of the devices may be made using ranging that is performed by transmitting UWB (Ultra Wide Band) pulses between the various devices within the WPAN. Alternatively, each device may include GPS (Global Positioning System) functionality and information corresponding to the specific locations of the devices may be communicated between the devices, and that information may be used to group devices user and/or assign profiles to govern the communication to and from the devices.

28 Claims, 16 Drawing Sheets

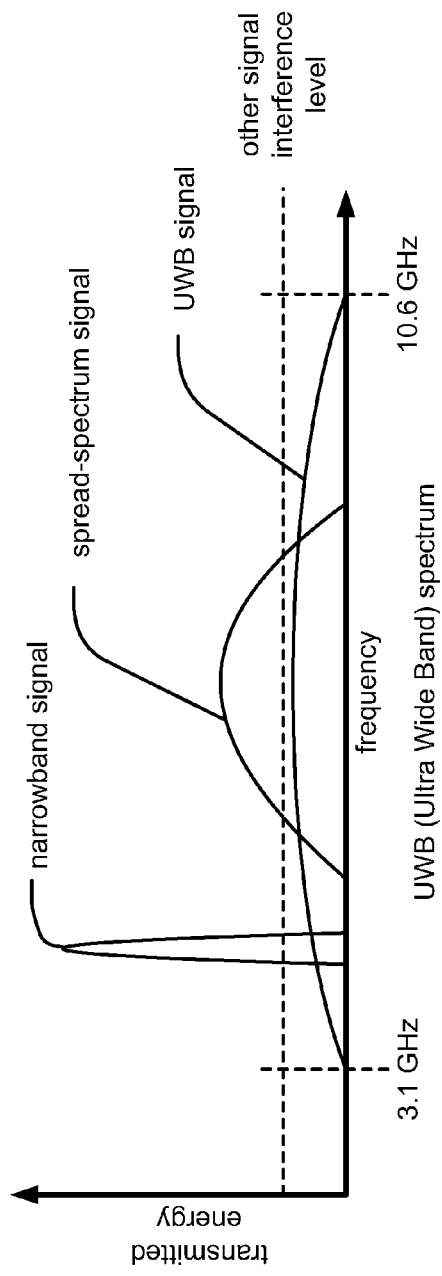
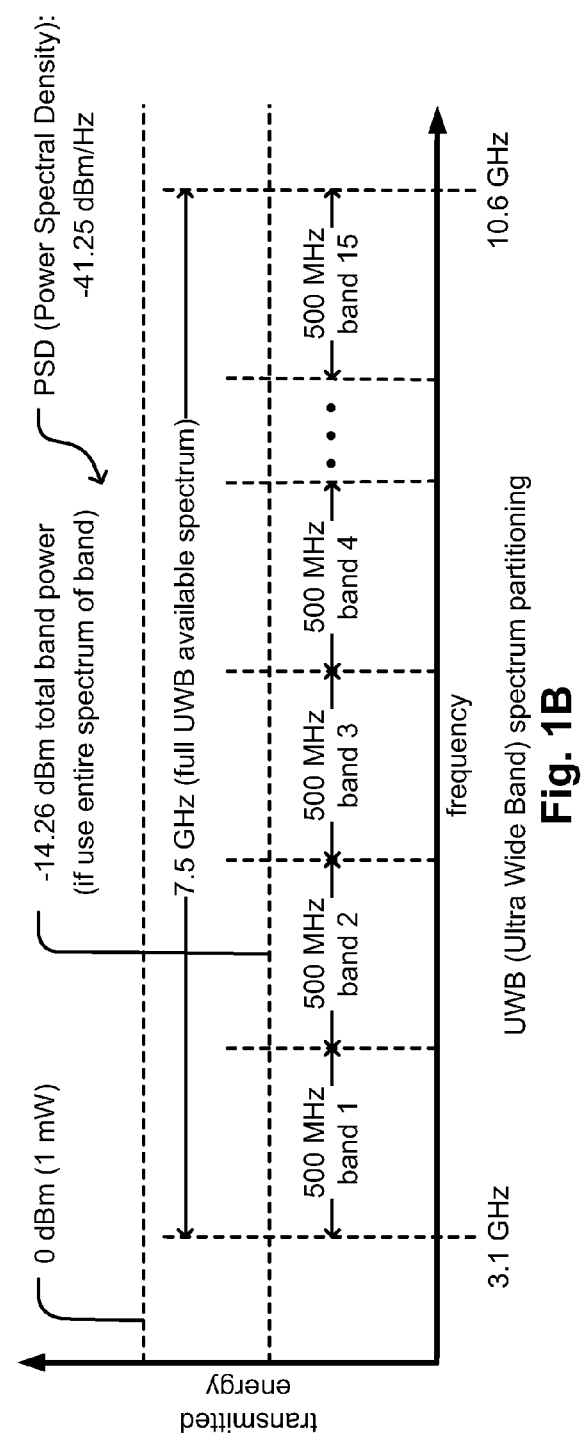

piconet (shown in wireless communication system embodiment)

TFC (time frequency code) (having period)

CDMA (Code Division Multiple Access)

OFDM (Orthogonal Frequency Division Multiplexing) modulation position based intra-piconet management (shown in a radial embodiment)

position based inter-piconet management (shown in a radial embodiment)

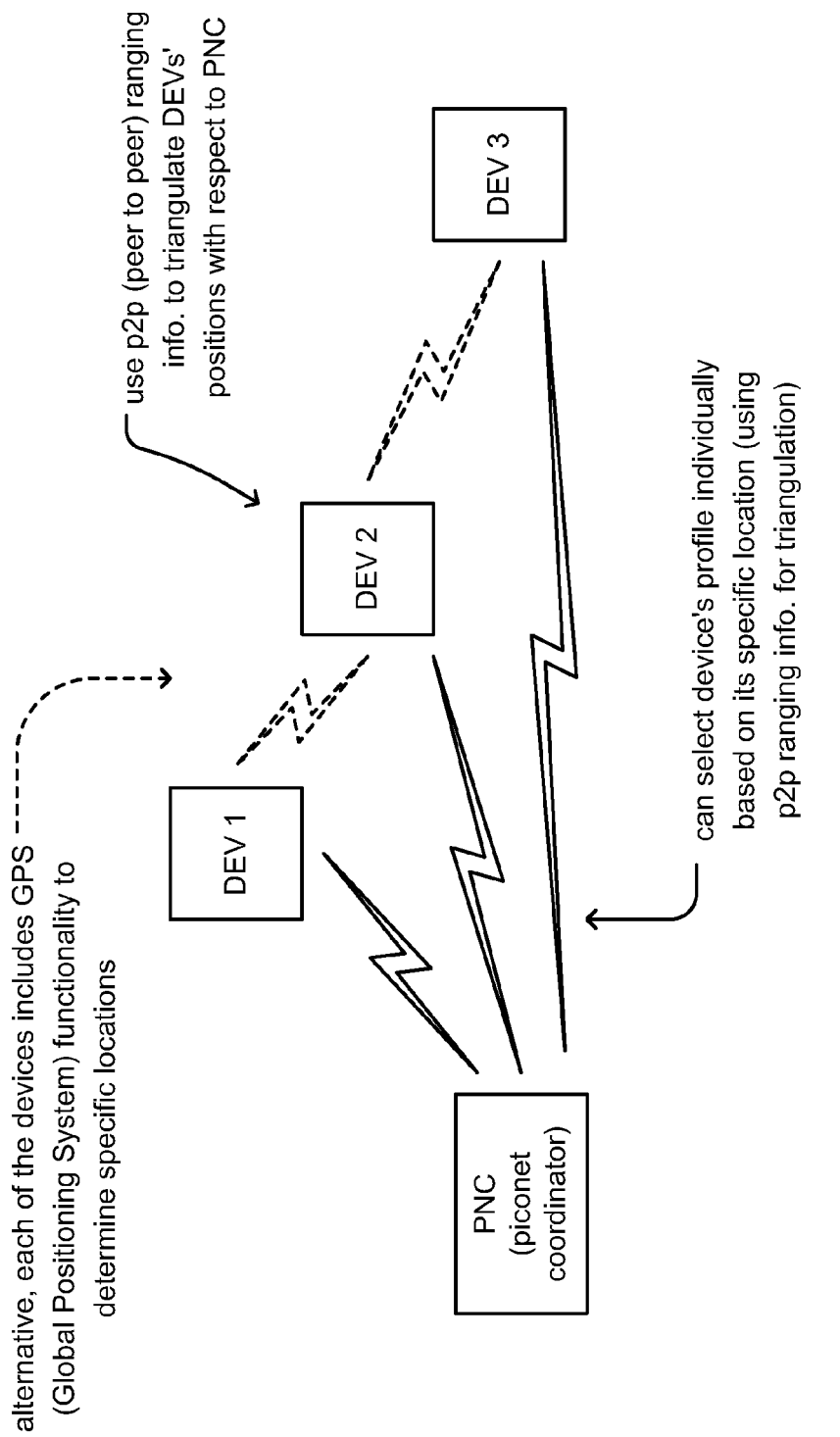

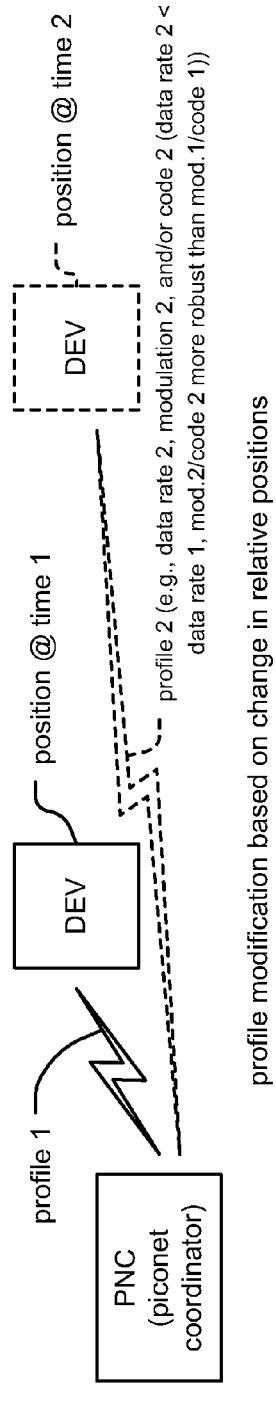
Fig. 10A profile modification based on change in relative positions
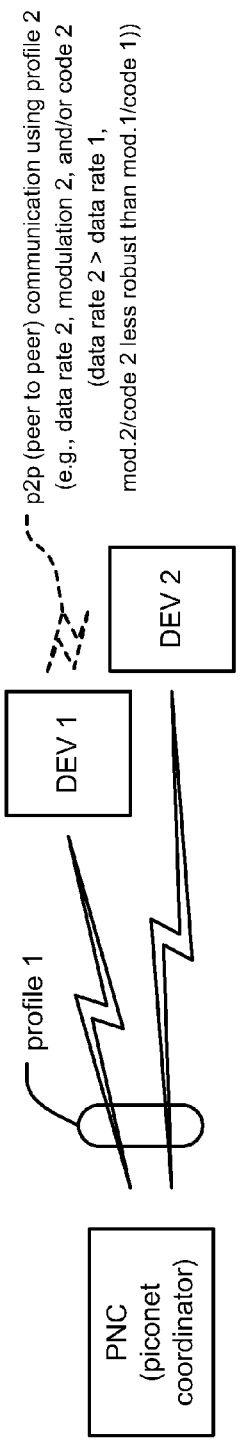
Fig. 10B PNC sets up p2p (peer to peer) communication based on relative positions of DEVs
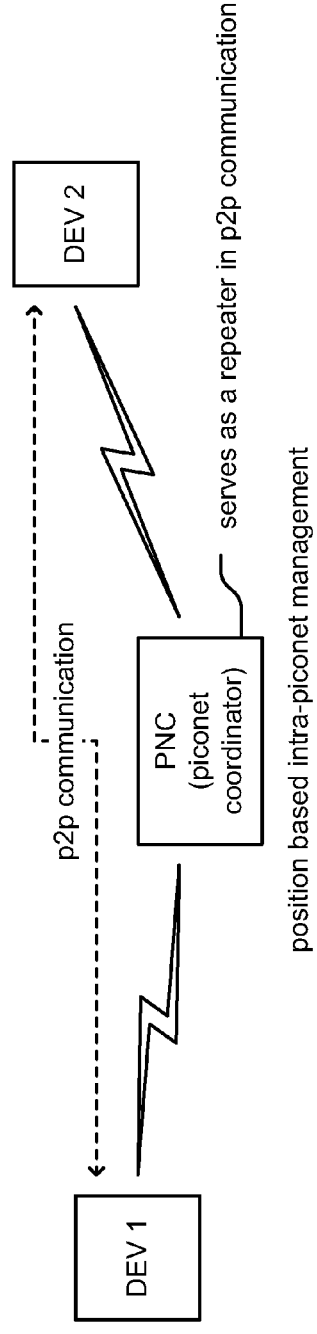
Fig. 10C position based intra-piconet management example modulation density modification based on position of devices WPAN (Wireless Personal Area Network) management method

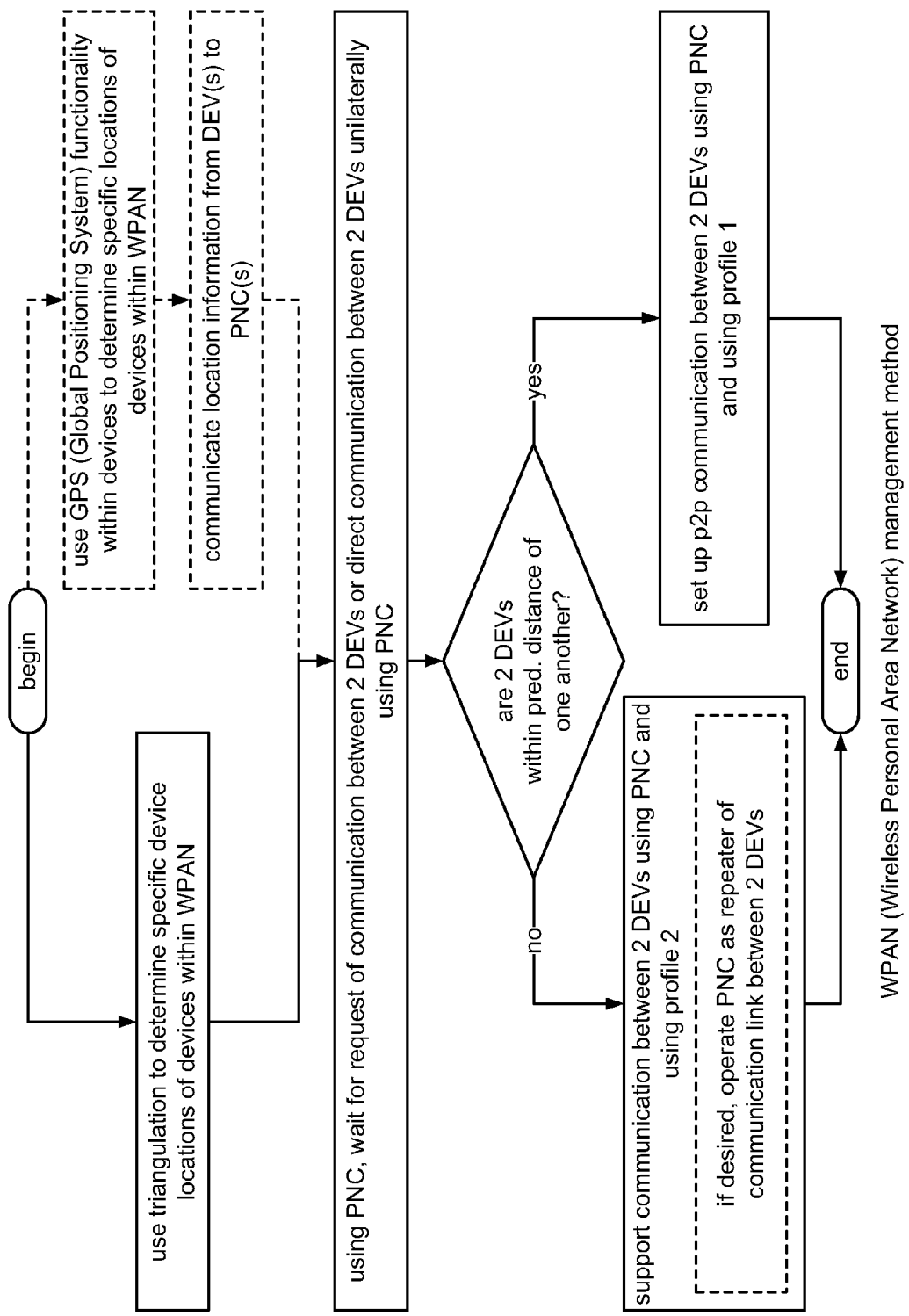

POSITION BASED WPAN (WIRELESS PERSONAL AREA NETWORK) MANAGEMENT

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
  1. U.S. Utility application Ser. No. 10/668,527, entitled "Position based WPAN (Wireless Personal Area Network) management,", filed Sep. 23, 2003, pending, which claims priority pursuant to 35 U.S.C. §119(e) to the following U.S. Provisional Patent Application which is hereby incorporated herein by reference in its entirety and made part of the present U.S. Utility patent application for all purposes:
    a. U.S. Provisional Application Ser. No. 60/472,336, entitled "Position based WPAN (Wireless Personal Area Network) management,", filed May 21, 2003, now expired.

BACKGROUND OF THE INVENTION

1. Technical Field of the Invention

The invention relates generally to communication systems; and, more particularly, it relates to managing communications within such communication systems.

2. Description of Related Art

Data communication systems have been under continual development for many years. In recent years, the development of piconet type communication systems has been under increasing development. A piconet may be viewed as a network that is established when two devices connect to support communication of data between themselves. Sometimes, piconets are referred to as PANs (Personal Area Networks). These piconets typically operate within a region having a radius of up to approximately 10 meters.

As is known, the Bluetooth® communication standard is the first such PAN communication standard that has been developed. In accordance with the Bluetooth® communication standard, the communication between the various devices in such a piconet is strictly performed using an M/S (Master/Slave) configuration. Each of the devices within such a Bluetooth® piconet is M/S capable. Typically one of the devices (sometimes referred to as piconet controller in this situation), or a first device within the Bluetooth® piconet, transmits a beacon signal (or an access invitation signal) while operating as the "master" device of the Bluetooth® piconet to the other "slave" devices of the Bluetooth® piconet. In other words, the "master" device of the Bluetooth® piconet polls the other "slave" devices to get them to respond.

However, other piconets may be implemented such that the devices do not operate according to such an M/S (Master/Slave) type relationship. In such instances, various piconet operable devices operate may be referred to as PNCs (piconet coordinators) and DEVs (user piconet devices that are not PNCs). The PNCs operate to coordinate the communication between themselves and the DEVs within the piconet. Sometimes, such a PNC may be implemented to operate as a master with respect to the 1 or more DEVs that operate as slaves, but this need not be the case in all instances—the strict M/S relationship is typically the case only in a Bluetooth® piconet.

In even some other instances, two or more piconets operate cooperatively such that at least two piconets operate such that they share at least one common device in a scatternet implementation. For example, in a scatternet, a single DEV may interact with two or more PNCs. This implementation will allow various devices within different piconets that are located relatively far from one another to communicate through the PNCs of the scatternet. However, within a scatternet implementation, a problem may arise such that each of the individual piconets must be able to operate in relative close proximity with other piconets without interfering with one another. This inherently requires a great deal of synchronization between the piconets, which may be very difficult to achieve in some instances. It is also noted that independently operating piconets, not implemented within a scatternet implementation, may also suffer from deleterious effects of interference with other piconets located within relative close proximity.

Some PAN communication standards and recommended practices have been developed (and some are still being developed) by the IEEE (Institute of Electrical & Electronics Engineers) 802.15 working group. These standards and recommended practices may generally be referred to as being provided under the umbrella of the IEEE 802.15 working group. Perhaps the most common standard is the IEEE 802.15.1 standard which adopts the core of Bluetooth® and which generally can support operational rates up to approximately 1 Mbps (Mega-bits per second).

The IEEE 802.15.2 recommended practice specification has been developed in an effort to support the co-existence of the IEEE 802.15.1 Bluetooth® core with virtually any other wireless communication system within the approximate 2.4 GHz (Giga-Hertz) frequency range. As some examples, the IEEE 802.11a and IEEE 802.11g WLAN (Wireless Local Area Network) standards both operate within the approximate 2.4 GHz frequency range. This IEEE 802.15.2 recommended practice specification has been developed to ensure that such a WLAN and a piconet may operate simultaneously within relatively close proximity of one another without significant interference with one another.

In addition, the IEEE 802.15.3 high data rate PAN standard has been developed in an effort to support operational rate up to approximately 55 Mbps. In this IEEE 802.15.3 standard, the PNCs and DEVs do not operate according to an M/S relationship as they do according to Bluetooth®. In contradistinction, a PNC operates generally as an AP (Access Point) and manages the various DEVs such that they are guaranteed to perform their respective communication according to their appropriate time slots thereby ensuring proper performance and operation within the piconet. An extension of the IEEE 802.15.3 high data rate PAN standard is the IEEE 802.15.3 WPAN (Wireless Personal Area Network) High Rate Alternative PHY Task Group 3a (TG3a). This is sometimes referred to the IEEE 802.15.3a extended high data rate PAN standard, and it can support operational rates up to 480 Mbps Yet another standard developed by the IEEE 802.15 working group is the IEEE 802.15.4 low data rate PAN standard that generally supports data rates within the range of approximately 10 kbps (kilo-bits per second) and 250 kbps.

Typically within such WPANs, the communication between each of the user devices and a PNC (piconet coordinator) (as well as between the various user devices via p2p (peer to peer) communication) is performed according to a common scheme such as a single code rate, a single modulation, and/or a single data rate. There does not presently exist in the art any means by which the communication to and from the various devices of one or more piconets may be handled in any other way besides according to such a common scheme.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 1A is a diagram illustrating an embodiment of the frequency spectrum of a UWB (Ultra Wide Band) signal when compared to some other signal types according to the invention.

FIG. 1B is a diagram illustrating an embodiment of UWB (Ultra Wide Band) spectrum partitioning into a plurality of sub-bands according to the invention.

FIG. 9 is a diagram illustrating an embodiment of position based intra-piconet management (shown using triangulation) that is performed according to the invention.

FIG. 10A is a diagram illustrating an embodiment showing profile modification based on change in relative positions of devices within a piconet.

FIG. 10B is a diagram illustrating an embodiment of how a PNC (piconet coordinator) sets up p2p (peer to peer) communication between 2 DEVs (user piconet devices) based on their relative positions within a piconet according to the invention.

FIG. 10C is a diagram illustrating another embodiment showing position based intra-piconet management according to the invention.

FIG. 14, FIG. 15, and FIG. 16 are flowcharts illustrating various embodiments of WPAN (Wireless Personal Area Network) management methods that are performed according to the invention.

DETAILED DESCRIPTION OF THE INVENTION

FIG. 1A is a diagram illustrating an embodiment of the frequency spectrum of a UWB (Ultra Wide Band) signal when compared to some other signal types according to the invention. In contradistinction to RF (Radio Frequency) communications that operate by using a narrowband frequency carrier to transmit information, UWB communications operate by sending pulses of energy across a broad frequency spectrum. For example, an RF signal may be viewed as occupying the range of spectra of a narrowband frequency. Also, in contradistinction to a spread-spectrum signal whose PSD (Power Spectral Density) generally rises above the PSDs of other interfering signals within an available spectrum and also occupies a relatively narrower portion of the available spectrum, a UWB signal may actually be viewed as being a pulse shaped signal (that may never exceed the PSDs of other interfering signals within the available spectrum). A spread-spectrum signal may be viewed a signal that occupies a frequency band that is much wider than the minimum bandwidth required by the information signal. For example, a transmitter "spreads" the energy (that is typically originally concentrated in narrowband) across a wider frequency band. One benefit of a spread-spectrum signal is that it provides increased immunity with respect to narrowband interference. A narrowband signal will not fully obliterate the UWB signal because of the much wider bandwidth of the UWB signal. It is also important to note that a UWB signal may also be characterized as a function of time, not frequency.

FIG. 1B is a diagram illustrating an embodiment of UWB (Ultra Wide Band) spectrum partitioning into a plurality of sub-bands according to the invention. Relatively recently, the FCC (Federal Communications Commission) has defined the available spectrum for UWB communications as being between 3.1 GHz (Giga-Hertz) and 10.6 GHz. In addition, the FCC defined the minimum spectral width of any UWB signal within the available UWB spectrum to be 500 MHz (Mega-Hertz).

Moreover, this FCC definition allows for a PSD across the UWB spectrum of −41.25 dBm/MHz of bandwidth. As a reminder, 0 dBm is the decibel (dB) measure of power of a signal referenced to 1 mW (milli-Watt). This means that the total power that may be employed by a UWB signal is approximately −14.26 dBm in any individual 500 MHz sub-band within the entire available UWB bandwidth of 7.5 GHz. In addition, if a pulse is sent using the entire 7.5 GHz of available UWB bandwidth, then the total transmitted power of a UWB signal is approximately −2.5 dBm.

Figure 2A:
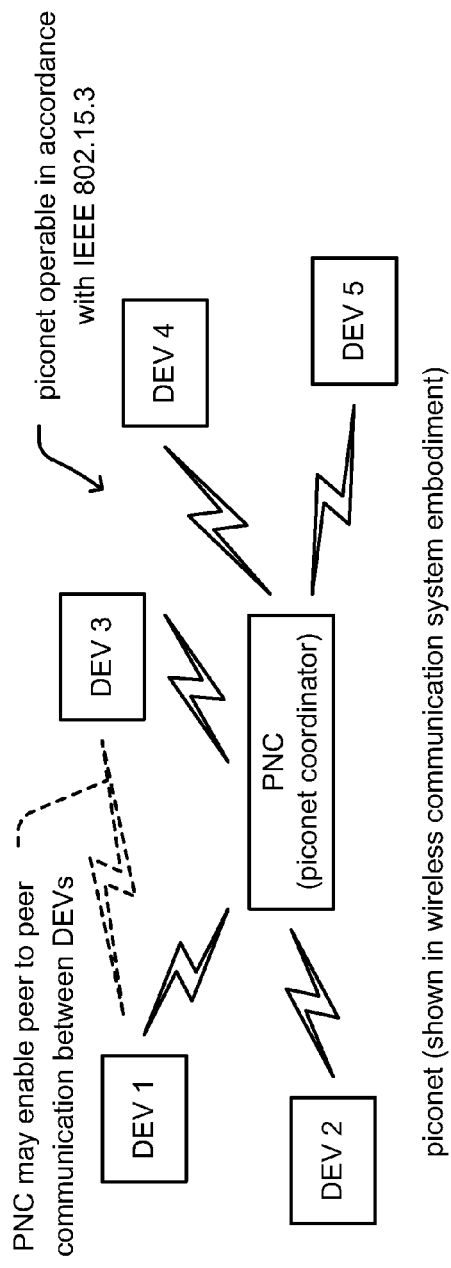
FIG. 2A is a diagram illustrating an embodiment of a piconet (shown as a wireless communication system) that is built according to the invention.

FIG. 2A is a diagram illustrating an embodiment of a piconet (shown as a wireless communication system) that is built according to the invention. As described briefly above, a piconet may be viewed as being the network that is established when any two devices connect to support communication between them. The piconet may be implemented using a PNC (piconet coordinator) and 1 or more DEVs (piconet devices). In some instances, the DEVs do not communication directly with one another, but with each other through the PNC.

To support communication between each of the DEVs, simultaneously at some times, and the PNC, the communication must be implemented in such a way that the communication links between each DEV and the PNC will not interfere with the other communication links in any other SOP (Simultaneously Operating Piconet) within a relatively close proximity. That is to say, when two or more piconets operate within relatively close proximity to one another, the communication within each of the respective piconets must be implemented in such a way that simultaneously operation of the two or more piconets (e.g., the coexistence and operation) may be performed without interfering with one another. It is also noted that the PNC may also operate to enable p2p (peer to peer) communication between two DEVs within a piconet. Moreover, the piconet in this embodiment, as well as within other embodiments described herein are operable in accordance with the constraints provided by the IEEE 802.15.3a standard and may also be implemented such that the piconet is operable in accordance with other wireless communication standards as well.

Figure 2B:
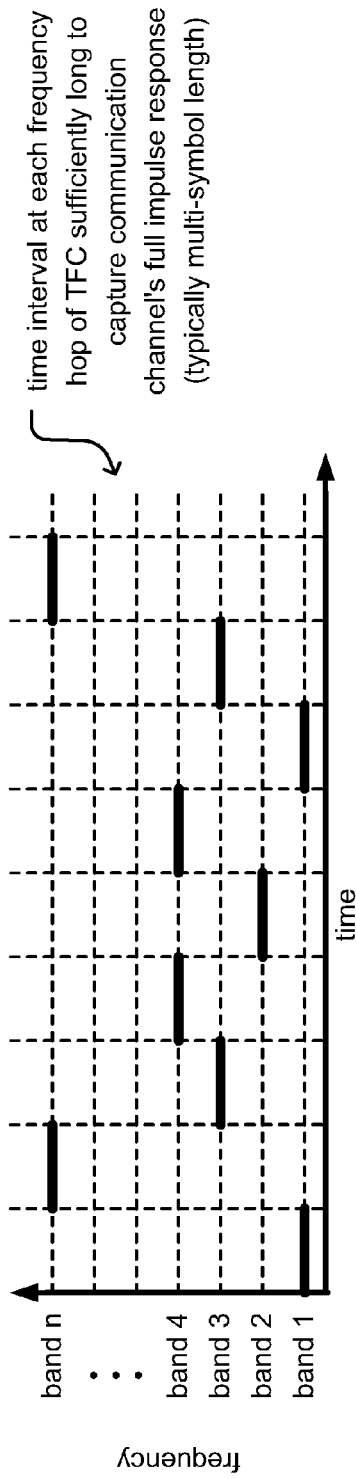
FIG. 2B is a diagram illustrating an embodiment of a TFC (time frequency code) (having a period) that may be employed according to the invention.

FIG. 2B is a diagram illustrating an embodiment of a TFC (time frequency code) (having a period) that may be employed according to the invention. As a function of time, the frequency band that is being used will "hop" from one frequency band to another according to the TFC. The use of a TFC is one means of operation that may be used to make a communication channel more robust. For example, when noise, such as background noise, is relatively localized to a particular portion of the spectrum, the TFC will help minimize the deleterious effects this frequency specific and frequency localized noise.

Frequency hopping may be viewed as a periodic switching of the frequency of a signal during transmission. In a communication system, a transmitter and a receiver operate in synchronization so that each operates at the same frequency at any given time. In this particular embodiment, an available frequency spectrum is sub-divided into n bands. The communication operates using a band 1 during a first time interval, then operates using a band n during a second time interval, then operates using a band 3 during a third time interval, and so on as indicated in the diagram.

It is also noted that the time interval between the various frequency hops is sufficiently long so as to permit the capture of a communication channel's full impulse response. This time interval at which the communication system operates at any given frequency will typically be multi-symbol lengths in duration.

As an example of the operation of frequency hopping, in the context a UWB signal, the UWB spectrum may be divided into 15 sub-bands of 500 MHz bandwidth, the frequency hopping may be viewed as hopping between the various 500 MHz bandwidth sub-bands as a function of time.

Figure 3:
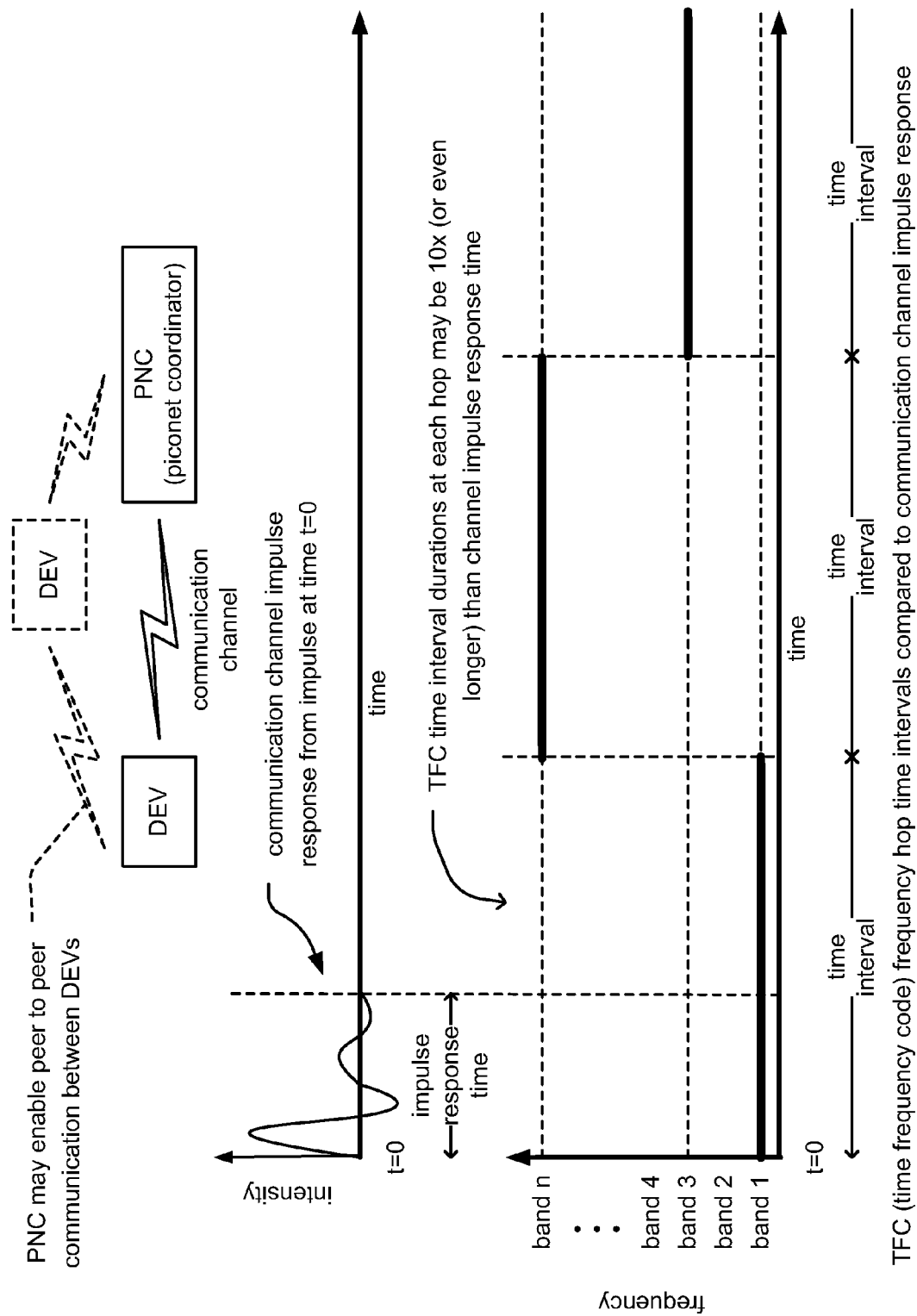
FIG. 3 is a diagram illustrating an embodiment showing TFC (time frequency code) frequency hop time intervals compared to a communication channel impulse response according to the invention.

FIG. 3 is a diagram illustrating an embodiment showing TFC (time frequency code) frequency hop time intervals compared to a communication channel impulse response according to the invention. The impulse response, as a function of time, is shown for the communication channel between two DEVs (or between a PNC and one of the DEVs). This impulse response may be viewed as the response of the communication system when an impulse is provided thereto. The impulse response varies in intensity as a function of time before dissipating. The time that the impulse response takes to dissipate completely may be viewed as the impulse response time of the communication channel.

When compared to the impulse response time of the communication channel, the TFC time interval durations at which the communication system operates using a first frequency band (shown as a band 1 during a first time interval) is much longer (e.g., substantially longer) than the impulse response time of the communication channel. In some embodiments, the TFC time interval durations are significantly longer that the impulse response time of the communication channel. As one example, the TFC time interval durations are may be up to ten times (e.g., 10×) longer than the impulse response time of the communication channel. This will allow all of the energy of a pulse to be captured when transmitted and when operating at this frequency band. Similarly, when the operation switches to another frequency band according to the TFC, then that corresponding time interval will also be longer than the impulse response time of the communication channel.

Within some prior art piconet approaches, frequency hopping alone has been implemented such that the time intervals are typically only of a single symbol's length; this is typically much shorter than the impulse response time of the communication channel. As such, much of the energy of a transmitted pulse may be lost if the frequency hops are performed too quickly. The longer duration over which the frequency hops are performed according to the invention allows for capturing of all of the energy of the transmitted pulse thereby ensuring more robust and more accurate communications. In addition, the invention provides a solution that employs combined OFDM encoding and TFC modulation of the OFDM symbols to support simultaneous operation of multiple piconets that each may include multiple DEVs.

It is again noted that a PNC enable p2p (peer to peer) communication between two separate DEVs within the piconet. The manner of communication described herein may be implemented with respect to communication between a PNC and the DEVs of the piconet and also may be implemented with respect to p2p communication between two separate DEVs within the piconet.

Figure 4:
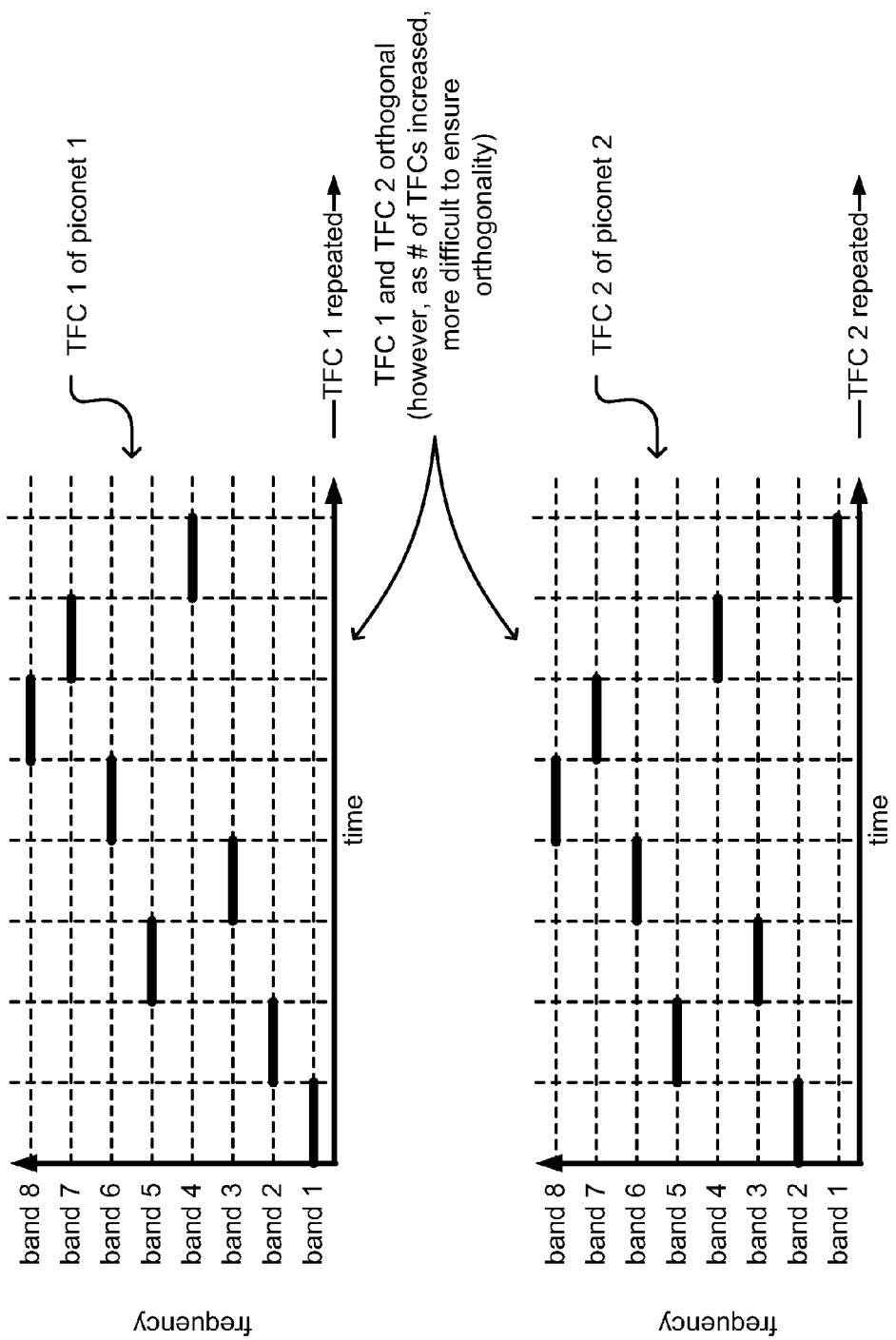
FIG. 4 is a diagram illustrating another embodiment of TFCs (time frequency codes) that may be employed according to the invention.

FIG. 4 is a diagram illustrating another embodiment of TFCs (time frequency codes) that may be employed according to the invention. This embodiment shows how two separate piconets may operate using two separate TFCs that are orthogonal to one another. However, it is also noted that as the number of TFCs employed to support communication of SOPs (Simultaneously Operating Piconets) continues to increase, and given the fact that there is a finite number of bands employed within any TFC, trying to maintain orthogonality of the TFCs will be more and more difficult. While this is possible with a small number of SOPs, it becomes impossible as the number of SOPs increases, given the inherent periodicity of the TFCs.

However, within an embodiment that employs only 2 SOPs, a piconet 1 employs a TFC 1 to support communication between the devices includes therein. In addition, a piconet 2 employs a TFC 2 to support communication between the devices includes therein. In this embodiment, during each time interval, the TFC 1 and the TFC 2 each operate using a different band. For example, when the TFC 1 operates using the band 1, the TFC 2 operates using the band 2. Similarly, when the TFC 1 operates using the band 2, the TFC 2 operates using the band 5. This orthogonal operation of the 2 TFCs continues for the duration of the operation of the respective SOPs.

Each of the respective TFCs is repeated to support subsequent operation within each of the respective piconets. This orthogonal operation of employing two TFCs allows more than one piconet to coexist in relative close proximity with one another. In addition, it is noted that each of the devices within a respective piconet will communicate with each other using the TFC that corresponds to that piconet.

Figure 5:
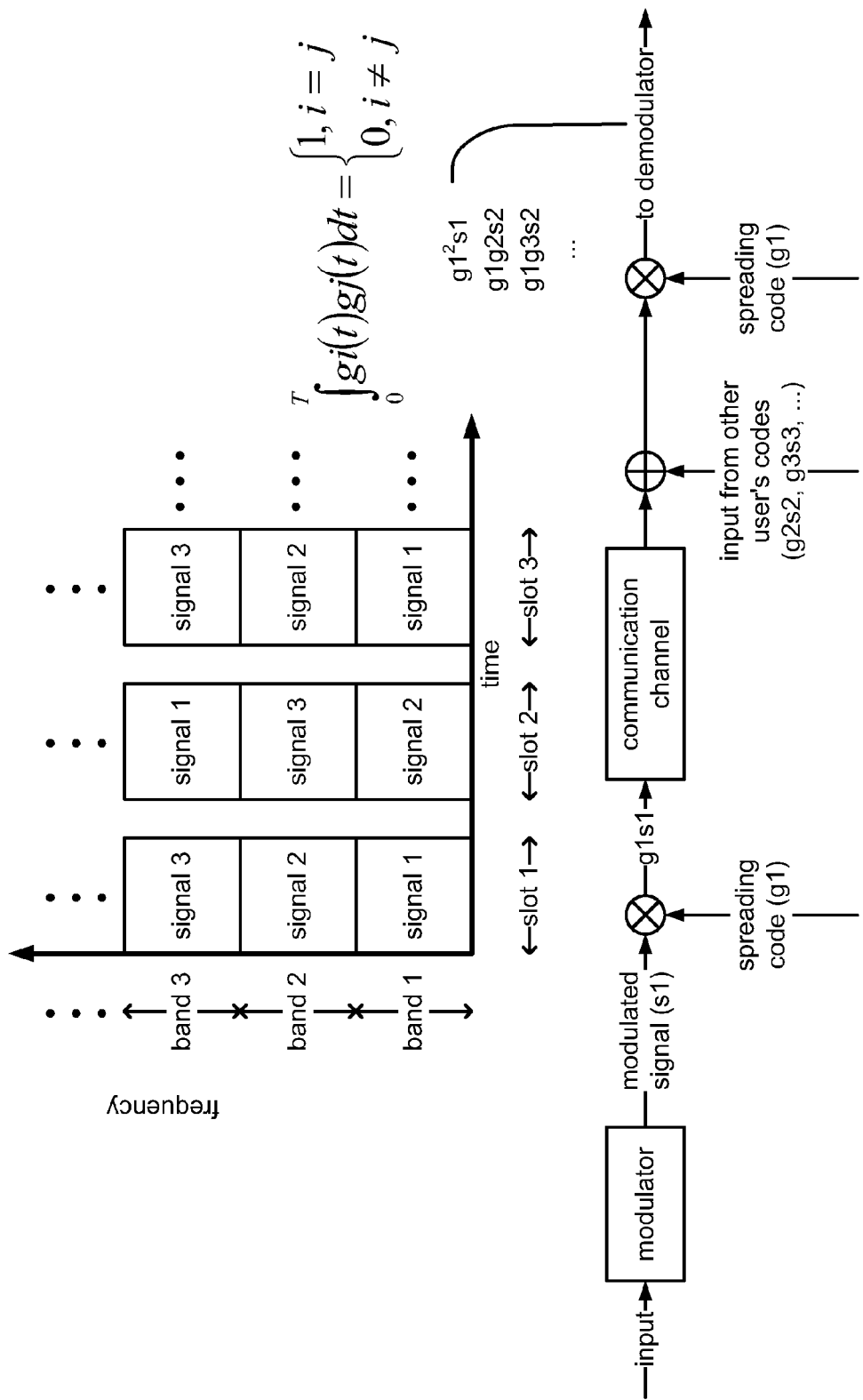
FIG. 5 is a diagram illustrating an embodiment of CDMA (Code Division Multiple Access) that may be employed according to the invention.

FIG. 5 is a diagram illustrating an embodiment of CDMA (Code Division Multiple Access) that may be employed according to the invention. CDMA may be viewed as the short term assignment of a frequency band to various signal sources. At each successive time slot, the band assignments are reordered either adaptively or according to a predetermined sequence. For example, during a time slot 1, a signal 1 operates using a band 1, a signal 2 operates using a band 2, and a signal 3 operates using a band 3. Then, during a time slot 2, the signal 1 operates using the band 3, the signal 2 operates using the band 1, and the signal 3 operates using the band 2. During a time slot 3, the signal 1 operates using the band 1, the signal 2 operates using the band 2, and the signal 3 operates using the band 3.

The operation of communication devices (e.g., users) is performed using a PN (Pseudo-Noise) code that is typically orthogonal to the other PNs codes employed by the communication devices within the communication system. This PN code is oftentimes referred to as a spreading code. A modulated signal is spread using that spreading code and the spread signal is then transmitted across a communication channel. At a receiver end of the communication channel, this same spreading code (e.g., this PN code) is employed to de-spread the code so that data sent from a particular device may be demodulated by the appropriate destination device.

The operation of CDMA may be better understood when viewed as the transformation of an input signal through a communication system. At a transmitter end of a communication channel, input from a particular user is first provided to a modulator where the data is modulated by a carrier thereby generating a modulated signal (s1). Next, the data-modulated signal is then multiplied by a spreading code (g1) that corresponds to that particular user thereby generating a spread signal (g1s1) that is then provided to the communication channel. This signal may be viewed as a convolution of the frequency spectrum of the modulated signal and the frequency spectrum of the spreading code. Simultaneously, input from other users within the communication system is modulated and spread in an analogous manner.

At the receiver end of the communication channel, a linear combination of all of the spread signals provided by the other users is received, e.g., g1s1+g2s2+g3s3+ . . . and so on for all of the users. At the receiver end, the total received signal is then multiplied by the spreading code (g1) thereby generating a signal that includes $g1^2 s1$ plus a composite of the undesired signal (e.g., g1g2s2+g1g3s3+ . . . and so on).

In CDMA, the spreading codes are typically chosen such that they are orthogonal to one another. That is to say, when any one spreading code is multiplied with another spreading code, the result is zero. This way, all of the undesired signals drop out. Given that the spreading codes g1(t), g2(t), g3(t) and so on, the orthogonality of the spreading codes may be represented as follows:

$$\int_0^T gi(t)gj(t)dt = \begin{cases} 1, i = j \\ 0, i \neq j \end{cases}$$

This final signal, is then passed to a demodulator where the input that has been provided at the transmitter end of the communication channel is extracted and a best estimate is made thereof.

Figure 6:
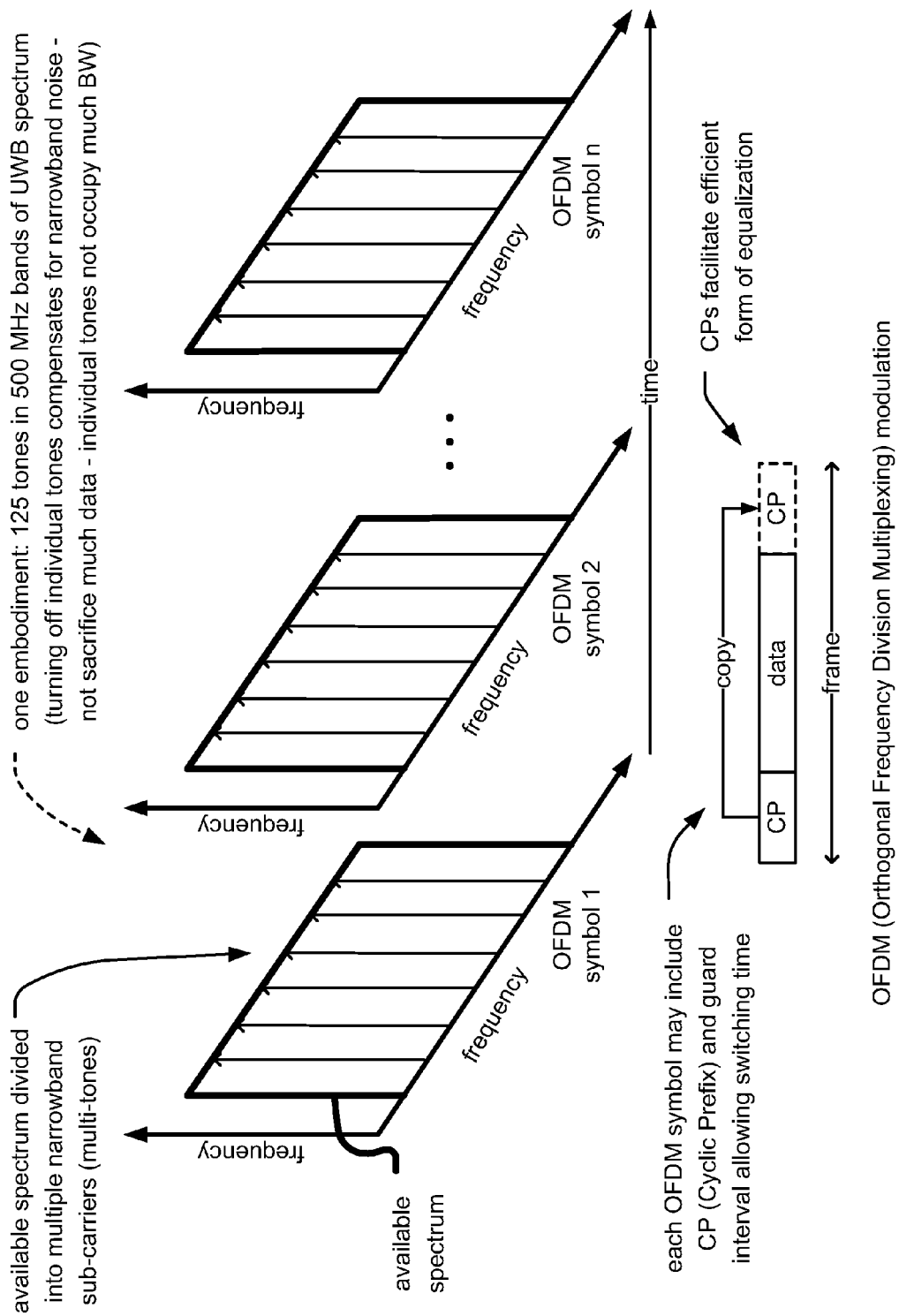
FIG. 6 is a diagram illustrating an embodiment of OFDM (Orthogonal Frequency Division Multiplexing) that may be employed according to the invention.

FIG. 6 is a diagram illustrating an embodiment of OFDM (Orthogonal Frequency Division Multiplexing) that may be employed according to the invention. OFDM encoding may be viewed a dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation coding techniques.

OFDM encoding operates by performing simultaneously transmission of a larger number of narrowband carriers (or multi-tones). Oftentimes a guard interval or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to combat any adverse effects of the channel response over which data is transmitted. In general, the CPs may be viewed as facilitating a more efficient form of equalization.

In one embodiment, 125 OFDM tones may be implemented to generate a UWB signal in any one of the 15 sub-bands of 500 MHz bandwidth within the UWB spectrum. Other benefits are also achieved using OFDM encoding. For example, the use of multi-tones allows for an effective solution to deal with narrowband interference. A tone that corresponds to the locality of the narrowband interference may be turned off (to eliminate the susceptibility to this narrowband interference) and still provide for efficient operation. This turning off of these one or few tones will not result in a great loss of bandwidth because each individual tone does not occupy a great deal of bandwidth within the available spectrum employed by the OFDM symbol. Therefore, OFDM encoding provides a solution that may be employed in accordance with the combined OFDM encoding and TFC modulation of the invention that allows for compensation of narrowband interference without sacrificing a great deal of bandwidth.

Figure 7:
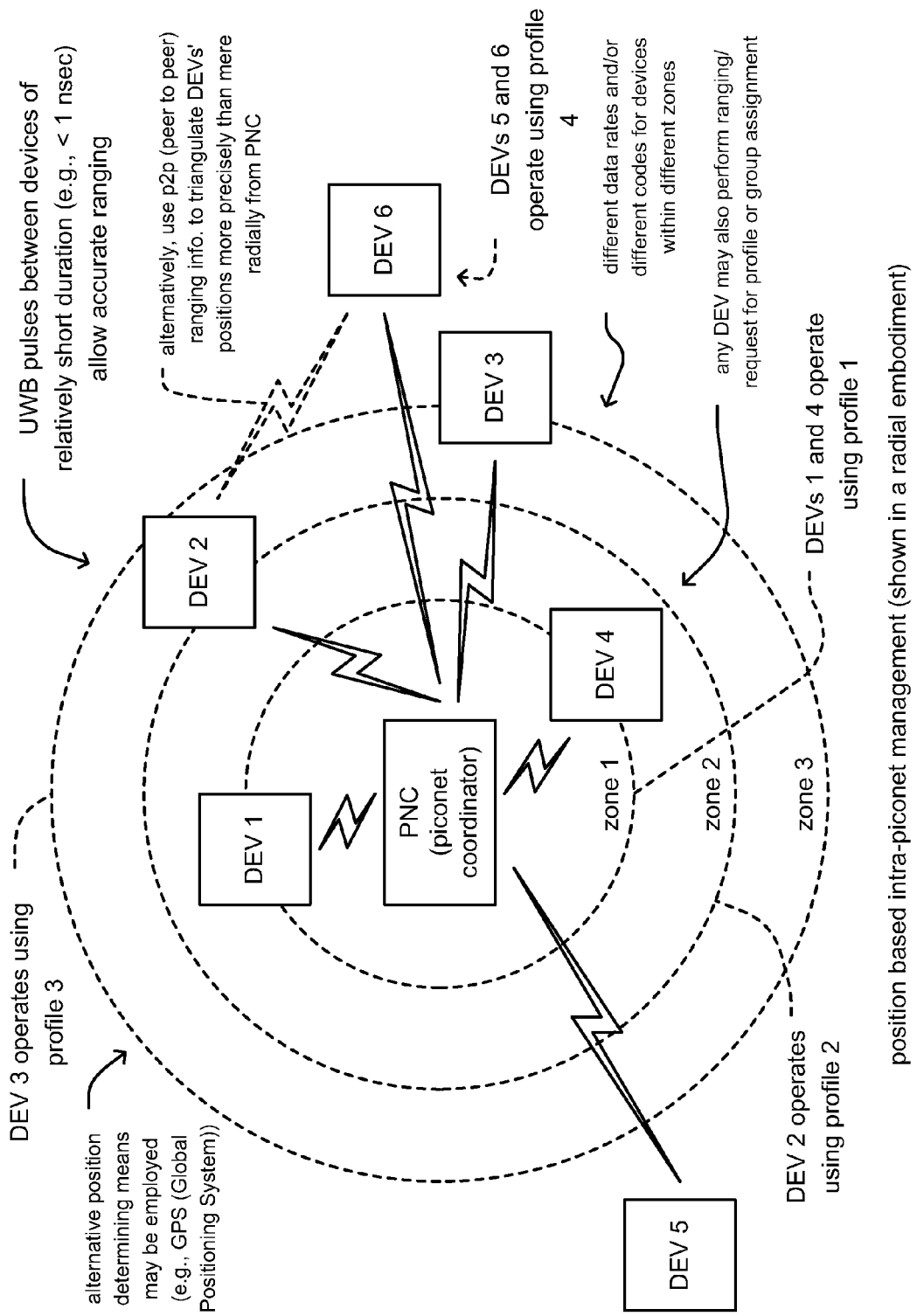
FIG. 7 is a diagram illustrating an embodiment of position based intra-piconet management (shown in a radial embodiment) that is performed according to the invention.

FIG. 7 is a diagram illustrating an embodiment of position based intra-piconet management (shown in a radial embodiment) that is performed according to the invention. This embodiment shows how the relative distances between various DEVs (user piconet devices) and a PNC (piconet coordinator) may be used to group the DEVs into at least 2 groups (e.g., more than 1 group). The determination made in this embodiment is strictly radial as emanating from the location of the PNC. For each DEV having a portion that may be reached (more specifically, having a portion able to support wireless communication) within a zone 1, these DEVs are all grouped within a group 1. In this particular embodiment, these DEVs are DEV 1 and DEV 4. Communication between these DEVs 1 & 4 and the PNC is governed according to a profile 1. There are a number of possible parameters that may be included within each profile, as is described in further detail below. Some of the possible parameters include code rate, modulation density, data rate, and/or TFC. However, other parameters may also be employed without departing from the scope and spirit of the invention.

Continuing on the grouping of DEVs within this embodiment, a DEV 2 is grouped into a zone 2. Communication between this DEV 2 and the PNC is governed according to a profile 2. Continuing on the grouping of DEVs within this embodiment, A DEV 3 is grouped into a zone 3. Communication between this DEV 3 and the PNC is governed according to a profile 3. Continuing on the grouping of DEVs within this embodiment, DEVs 5 & 6 are grouped into a group that is beyond or outside of the reach of the zone 3. Communication between these DEVs 5 & 6 and the PNC is governed according to a profile 4.

Each of the various profiles that govern the communication between the PNC and the DEVs of the various groups may include a number of parameters including a data rate, a modulation density, a code having a code rate, and a TFC, as well as any other parameters that a particular designer may choose to employ within a position based WPAN management system. Moreover, profiles selected from this set of possible profiles or from a different set of profiles may also be employed to govern p2p communication between the DEVs within the communication system.

Again, as shown in this embodiment, the grouping of the DEVs into the various groups is performed based on the radial distances emanating from the PNC in ever increasing circles (with respect to 2 dimensions) or ever increasing spheres (with respect to 3 dimensions). To determine these relative distances between the PNC and the DEVs, the PNC transmits UWB (Ultra Wide Band) pulses to each of the DEVs. After each corresponding DEV receives its respective UWB pulse, that DEV transmits another UWB pulse back to the PNC. The PNC performs ranging of the relative position of each DEV using the time duration of round trip time of the transmitted UWB pulse and the received UWB pulse thereby determining the relative distance between the PNC and each DEV. This may be performed borrowing on the relatively short duration of UWB pulses (e.g., typically less than 1 nsec (nano-sec) in duration). These UWB pulses will typically therefore travel at a velocity of approximately 1 nsec/ft (1 nano-sec per foot). This allows the PNC to resolve signals to within approximately 1 nsec time intervals thereby providing a relatively precise determination of the relative locations of the DEVs with respect to the PNC.

With respect to the ranging described and performed within this embodiment as largely being performed by the PNC, it is also noted that any one or more of the DEVs may also be implemented to perform such ranging. Such ranging performed by a DEV may be employed to make a request for a profile and/or assign that particular DEV to a group whose communication is governed according to a profile.

Other embodiments may use alternative means to determine position information of the various devices such as GPS (Global Positioning System) functionality included within the various devices and/or triangulation that includes at least 3 devices (e.g., the PNC and 2 DEVs). Such alternative embodiments are also referred to and described in more detail below.

Figure 8:
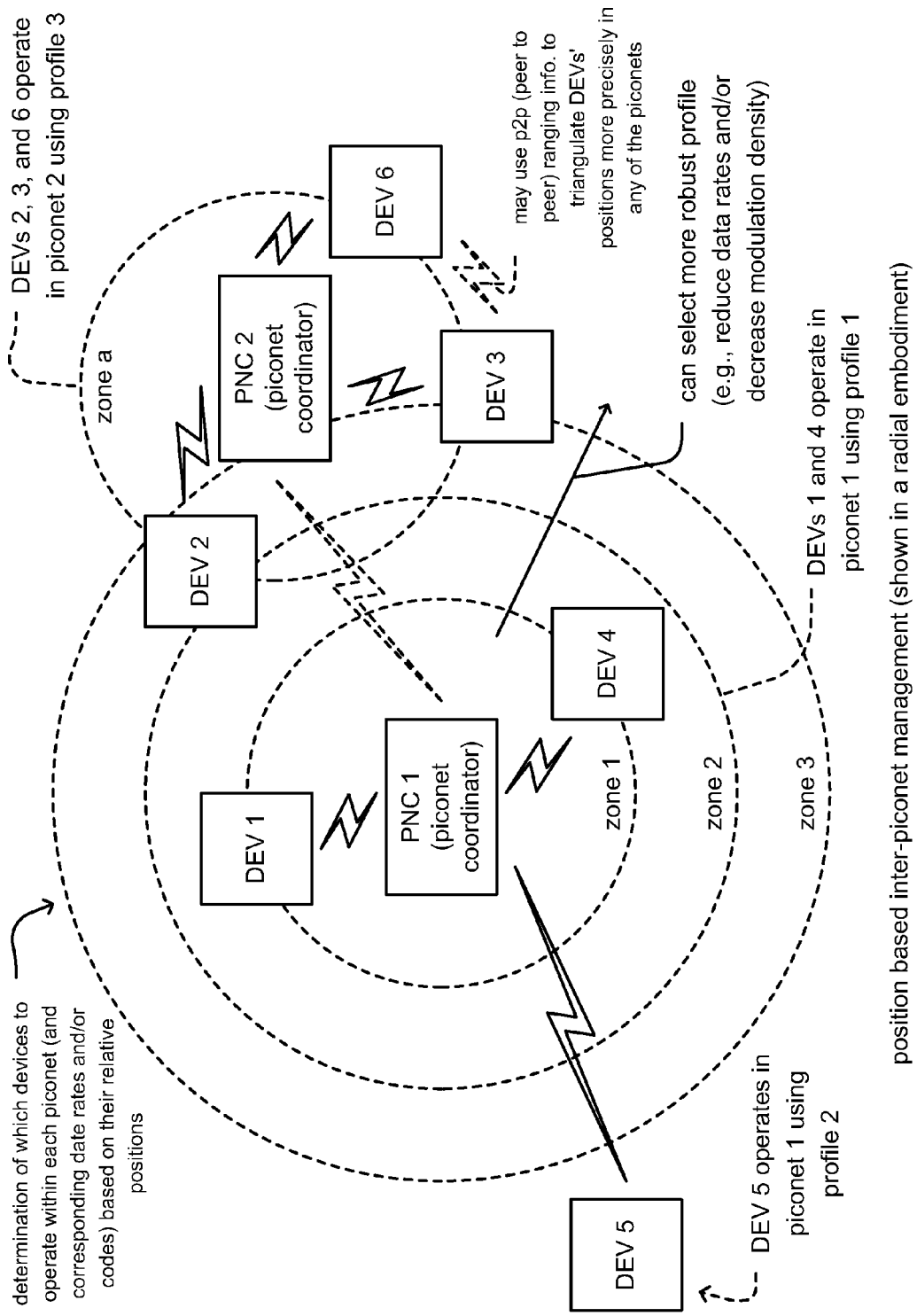
FIG. 8 is a diagram illustrating an embodiment of position based inter-piconet management (shown in a radial embodiment) that is performed according to the invention.

FIG. 8 is a diagram illustrating an embodiment of position based inter-piconet management (shown in a radial embodiment) that is performed according to the invention. This embodiment shows a number of DEVs and 2 PNCs within a region. Both of the PNCs 1 & 2 are operable to perform ranging of all of the DEVs within the region. Together, the PNC 1 and the PNC 2 perform this ranging of all of the DEVs, group them accordingly, an also select profiles that may be used to govern the communication between the DEVs and the PNCs 1 & 2. In addition, one or both of the PNCs 1 & 2 may also direct 2 or more of the DEVs to perform p2p communication between them and perform ranging of the relative distances between them; this information may then be provided to both of the PNCs 1 & 2. In doing so, triangulation may be performed by one or both of the PNCs 1 & 2 to determine the precise location of the DEVs within the region with respect to one or more of the PNCs 1 & 2.

The distribution of the DEVs in this embodiment is the same as the embodiment described above, except there are 2 PNCs in this embodiment. Therefore, the grouping of the DEVs may be performed differently while providing a more efficient implementation. For example, those DEVs closer in vicinity to the PNC 2 may be grouped within one group; DEVs 2, 3, & 6 may be grouped within a zone whose communication is governed according to a profile 3 in one piconet (e.g., piconet 2).

The PNC 1 services the other DEVs 1 & 4 (within a zone 1 using a profile 1), and the PNC 1 services DEV 5 (as being outside a zone 3 using a profile 2). These DEVs and the PNC 1 may be viewed as being another piconet (e.g., piconet 1).

It can be seen that the profiles may vary as becoming more robust as the group of DEVs is further away from the respective PNC. For example, as a communication link may become noisy, then a lower data rate, a lower density type modulation density, or a more robust code may be employed to govern communication to and from DEVs further from the appropriate PNC. This principle of increasing the robustness of a profile as the DEVs are further apart from the PNC is also applicable for the other embodiments as well; moreover, this principle may also be employed to select the appropriate profile to govern communication between 2 DEVs within p2p communication. When 2 DEVs are relatively close to one another, a less robust profile (e.g., higher data rate and/or higher modulation density) may be selected versus when 2 DEVs are relatively close to one another.

FIG. 9 is a diagram illustrating an embodiment of position based intra-piconet management (shown using triangulation) that is performed according to the invention. This embodiment show how triangulation may be employed using the ranging performed by p2p communication between the various DEVs as well as the ranging performed between the PNC and the DEVs. In knowing the relative distances between 3 different devices, it is known that their relative location with respect to one another can be determined with a high degree of accuracy.

For example, p2p ranging between a DEV 1 and a DEV 2 as well as the ranging information between the PNC and the DEV 1 and the DEV 2 may all be employed to determine the specific location of these devices within the region. The PNC may perform the ranging itself between the DEV 1 and the DEV 2, and the PNC may direct one or both of the DEV 1 and the DEV 2 to perform p2p ranging between themselves. Then, one or both of the DEV 1 and the DEV 2 may communicate this ranging information back to the PNC so that the PNC may perform triangulation to determine the specific locations of the 3 devices with respect to one another. This way, a more precise grouping of the DEVs may be performed. Alternatively, an appropriate profile may be selected for each and every DEV that may be serviced by the PNC. Triangulation may similarly be performed using the PNC and the DEVs 2 & 3.

Alternatively, each of the devices may contain GPS functionality that is able to discern the absolute location of the device on the earth within a particular precision as provide by the GPS functionality employed. This information may be transmitted between the various devices allowing for appropriate grouping and selecting of profiles to govern the communication to and from those devices. GPS technology has matured significantly over the recent years, and it is possible to include such location determining functionality within the various devices without any significant increase in complexity.

In any of the embodiments that perform ranging, triangulation, or GPS position determination, this position determination may be performed every so often as desired by a particular designer. For example, a predetermined time period may be selected, and the position determination may be performed after every elapse of this predetermined time period. More specifically, one or more of the GPS capable DEVs may be instructed to transmit its location to the PNC every n seconds (or minutes, or whatever time period is selected). Similarly, the ranging operation may be performed for one or more of the devices after every predetermined period of time has elapsed. Using this approach, dynamic changes in the relative positions of the devices with respect to one another may be ascertained every so often. This way, the grouping of the devices and/or selection of the appropriate profiles may be updated as needed to accommodate changes in the positions of the devices to ensure efficient operation of the overall system in reaction to any changes of position therein.

FIG. 10A is a diagram illustrating an embodiment showing profile modification based on change in relative positions of devices within a piconet. This embodiment shows how a profile 1 is employed to govern the communication between a PNC and a DEV at a time 1. Then, later, at a time 2, the DEV has changed position with respect to the PNC. A profile 2 is then selected to govern the communication between the PNC and a DEV at the time 2. The profiles 1 & 2 may be completely different, or they may only differ in as few as one parameter contained therein. For example, each of the profiles may have an associated data rate, a modulation density, a code rate, a TFC, or some other parameter. One or more of these parameters (or all of the parameters) within the profiles may be modified when switching from the profile 1 to the profile 2.

FIG. 10B is a diagram illustrating an embodiment of how a PNC (piconet coordinator) sets up p2p (peer to peer) communication between 2 DEVs (user piconet devices) based on their relative positions within a piconet according to the invention. In this embodiment, a PNC employs a profile 1 to govern the communication to and from the PNC and DEVs 1 & 2. Then, the PNC directs one or both of the DEVs 1 & 2 to support p2p communication between themselves. However, the PNC employs the relative location of the DEVs 1 & 2 with respect to one another, and the PNC directs them to employ a profile 2 to govern the communication between them.

This embodiment shows how various profiles may be employed and selected based on the relative locations of the devices communicating within the region. Given that the DEVs 1 & 2 are closer to one another than either one of them is to the PNC, they may be able to support a higher data rate between themselves than they can with the PNC. The data rate 2 associated with the profile 2 may be greater than the data rate 1 associated with the profile 1. Moreover, the modulation density 2 associated with the profile 2 may be less robust (e.g., have a higher modulation density) than the modulation density 1 associated with the profile 1, and the code 2 associated with the profile 2 may be less robust (e.g., have less redundancy or parity bits) than the code 1 associated with the profile 1. Given that the communication link between the user devices 1 & 2 (slaves) does not require such protective measures (e.g., it may be less noisy, etc.), a higher data rate may possibly be supported thereby providing faster transmission of information.

This embodiment may also support a situation when one of the DEVs seeks to communicate with the other of the DEVs via the PNC, and the PNC then, while considering the relative proximity of the DEVs to one another, unilaterally directs them to support p2p communication without a p2p communication request from either of the DEVs.

FIG. 10C is a diagram illustrating another embodiment showing position based intra-piconet management according to the invention. This embodiment shows how a PNC may serve as a repeater (e.g., a filter and/or an amplifier) of the p2p communication between the DEVs 1 & 2. The PNC may independently determine the relative locations of the DEVs 1 & 2 with respect to the PNC, and the PNC may unilaterally intervene to serve as the repeater thereby ensuring higher performance of the communication between the DEVs.

All of the various embodiments described herein benefit by having knowledge of the locations of the various devices within the region. In general, having such information allows the WPAN to be operated in such a way as to allow for the greatest possible amount of data throughput and also for a most efficient assignment of profiles to govern the respective communication links contained therein. This also allows for a most efficient use of the capabilities and processing resources of the various devices contained therein as well.

Figure 11:
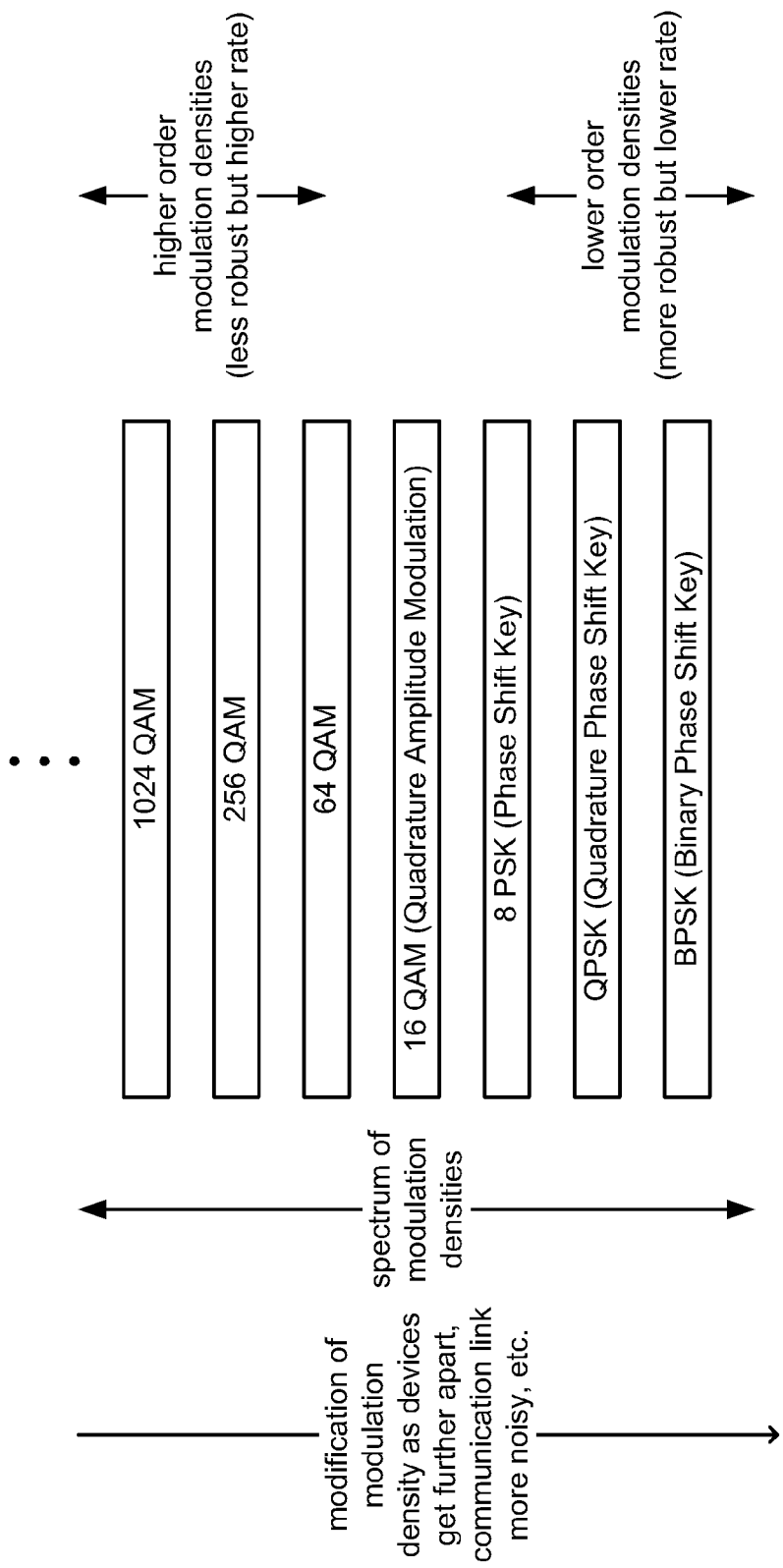
FIG. 11 is a diagram illustrating an example embodiment of modulation density modification based on position of devices within 1 or more piconets.

FIG. 11 is a diagram illustrating an example embodiment of modulation density modification based on position of devices within 1 or more piconets. The spectrum of modulation densities involves higher order modulation densities and lower order modulation densities. For example, the spectrum of modulation densities may range from 1024 QAM (Quadrature Amplitude Modulation), 256 QAM, 64 QAM, 16 QAM, 8 PSK (8 Phase Shift Key), QPSK (Quadrature Phase Shift Keying), and BPSK (Binary Phase Shift Key). Other modulation schemes could similarly be employed and arranged in an increasing/decreasing order of density without departing from the scope and spirit of the invention. The higher order modulation densities may be viewed as including the 1024 QAM and 256 QAM, and the lower order modulation densities may be viewed as including the 8 PSK, QPSK, and BPSK. In some embodiments, a higher order modulation density may be viewed as including only 16 QAM, and a lower order modulation density may be viewed as including only QPSK and/or BPSK.

The higher order modulation densities may be used within those communication links that are relatively free of noise and/or interference. For example, in communication links that have very little noise, a relatively very modulation density may be employed to allow the throughput of a higher amount of information. In contradistinction, the lower order modulation densities may be used within those communication links that have a relatively significant amount of noise and/or interference. These lower order modulation densities would allow for greater robustness of the data transmitted across such communication links.

It is noted that the varying of modulation density across this spectrum of modulation densities may be made in response to a number of factors including devices becoming further apart (such as when one device moves), when a communication link becomes more noisy, or some other constraint which may compromise, at least in part, the robustness of the communication link thereby making transmissions across the communication link more likely to suffer error or corruption of the data.

While this embodiment above shows how a single parameter (modulation density in this embodiment) may be modified for the various reasons described above. The embodiment below shows how any one or more parameters of a profile may be modified in response to such reasons.

Figure 12:
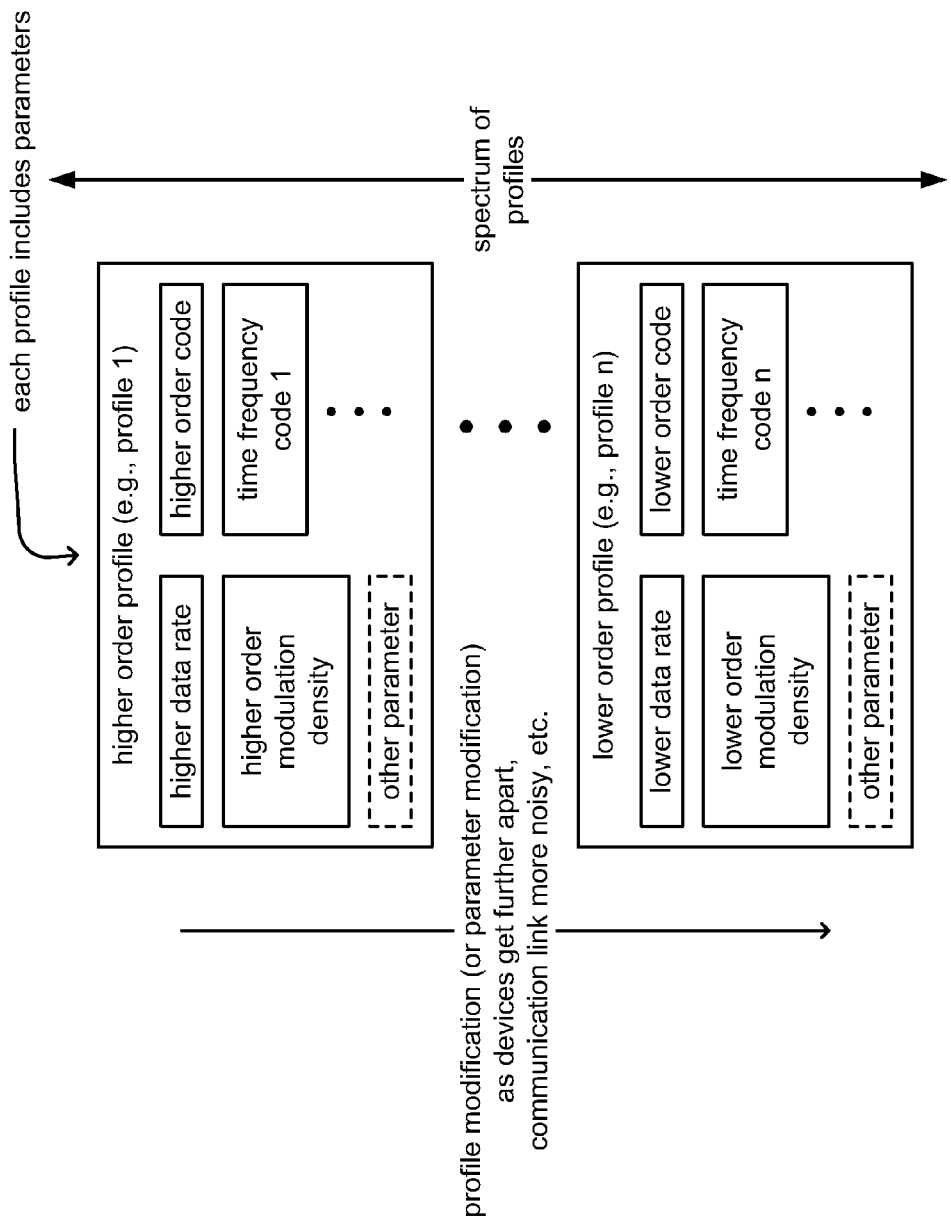
FIG. 12 is a diagram illustrating an example embodiment of profile modification based on position of devices within 1 or more piconets.

FIG. 12 is a diagram illustrating an example embodiment of profile modification based on position of devices within 1 or more piconets. This embodiment shows how profile modification (or parameter modification) may be performed across a spectrum of available profile. Each profile may have a number of parameters that are used to govern communication between 2 or more devices. For example, each profile may include any one or more of a data rate, a modulation density, a code having a code rate that provides a degree of redundancy (as in the context of FEC (Forward Error Correction) coding), a TFC, as well as any other parameter that may be desired in a give embodiment.

The spectrum of profiles may be divided into a number of discrete profiles varying from higher order profiles to lower order profiles. For example, the higher order profiles may provide for greater throughput of data across communication links of a relatively high quality (e.g., lower noise, higher reliability, etc.). The lower order profiles may provide for communication of data across communication links of a relatively poor quality (e.g., higher noise, lower reliability, etc.). For example, when comparing a higher order profile to a lower order profile, the higher order profile may have a higher data rata, a higher order modulation density (e.g., more constellation points), a higher order code (e.g., with more redundancy or parity), and a more robust TFC when compared to the TFC than that of a lower order profile.

The modification of the appropriate profile to be used to govern communication between two devices may be made for many of the same reasons provide in the embodiment above when described with respect to changing the modulation density. For example, as devices get further apart, or if a communication link is relatively noisier, or for some other appropriate reason, a different profile may be selected. More specifically, if the relative distance between two devices that are communicating with one another become larger, then a more robust (or lower order) profile may be selected to govern future communication between those two devices. Analogously, if the relative distance between two devices that are communicating with one another become smaller, then a less robust (or higher order) profile may be selected to govern future communication between those two devices. This way, the profile used to govern the communications may be adaptive in response to the locations of the various devices within such a communication system. Again, there are also other considerations that may be employed to direct the selection of alternative profiles as well without departing from the scope and spirit of the invention.

In addition, there may be instances where only a single parameter of a profile need be modified in response to such considerations.

Figure 13:
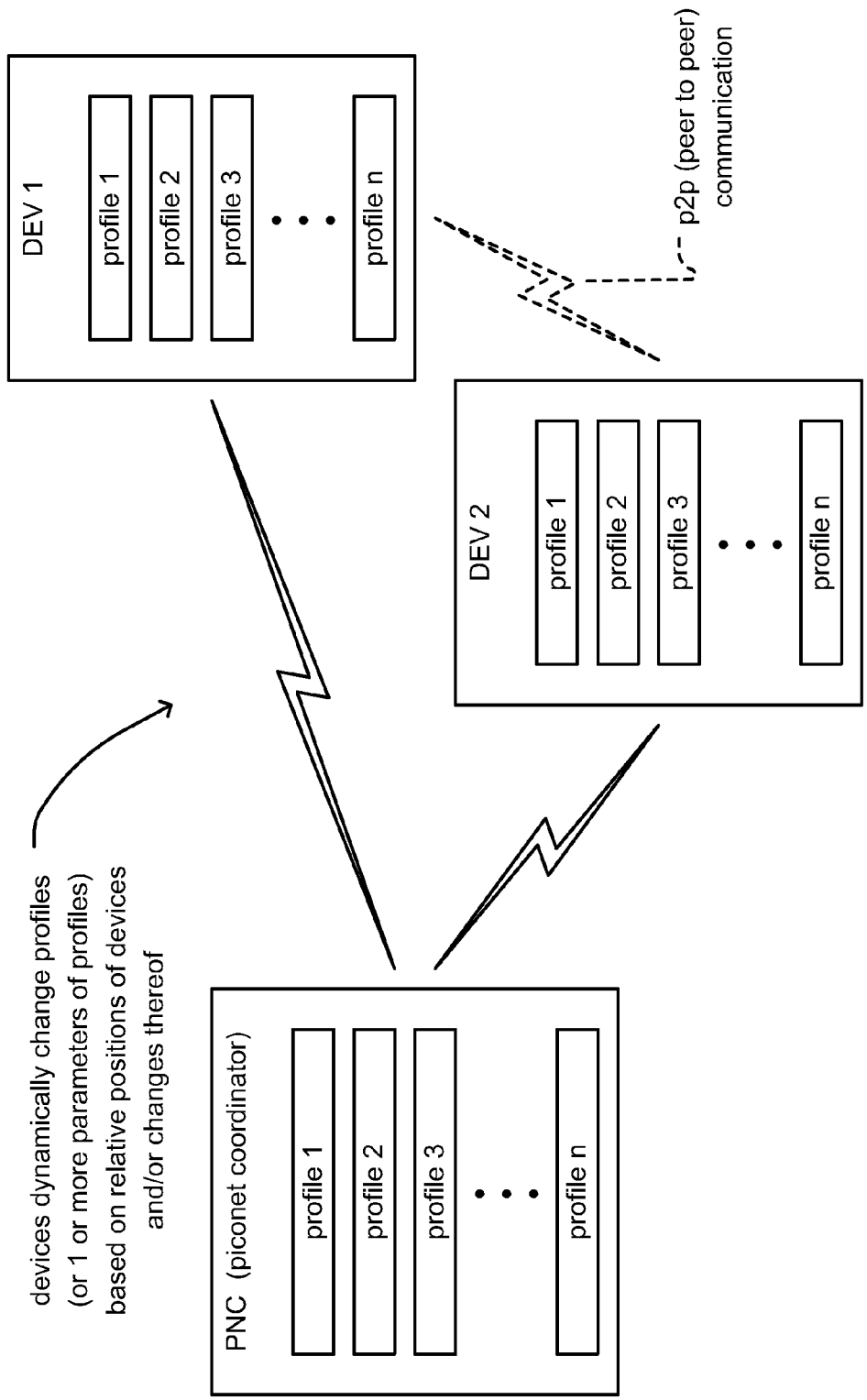
FIG. 13 is a diagram illustrating a piconet embodiment showing a predetermined, finite set off profiles (and corresponding parameters) stored within various devices according to the invention.

FIG. 13 is a diagram illustrating a piconet embodiment showing a predetermined, finite set off profiles (and corresponding parameters) stored within various devices according to the invention. This embodiment shows how a number of devices may all include information corresponding to a finite set of profiles that may be selected to govern communication between two devices. For example, a PNC may include information corresponding to a profile 1, a profile 2, a profile 3, . . . , and a profile n. Similarly, each of the DEVs within the communication system may also include information corresponding to the profile 1, the profile 2, the profile 3, . . . , and the profile n. This way, when communication is to be supported between any 2 of these devices, both of the devices will have information corresponding to the appropriate profile so that they may communicate effectively (e.g., both use and expect one or more of the same data rate, the same code, the same modulation density, and/or the same TFC).

As an example, the PNC may communicate with the DEV 1 such that both the PNC and the DEV 1 both employ the profile 2. Analogously, the PNC may communicate with the DEV 2 such that both the PNC and the DEV 2 both employ the profile n. Also analogously, the PNC may direct the DEV 1 and the user device 2 to perform p2p communication between them such that both the DEV 1 and the DEV 2 both employ the profile 1 in their p2p communication. By providing the information corresponding to the various profiles to each of the devices, they may all be able to support effective communication between themselves.

Figure 14:
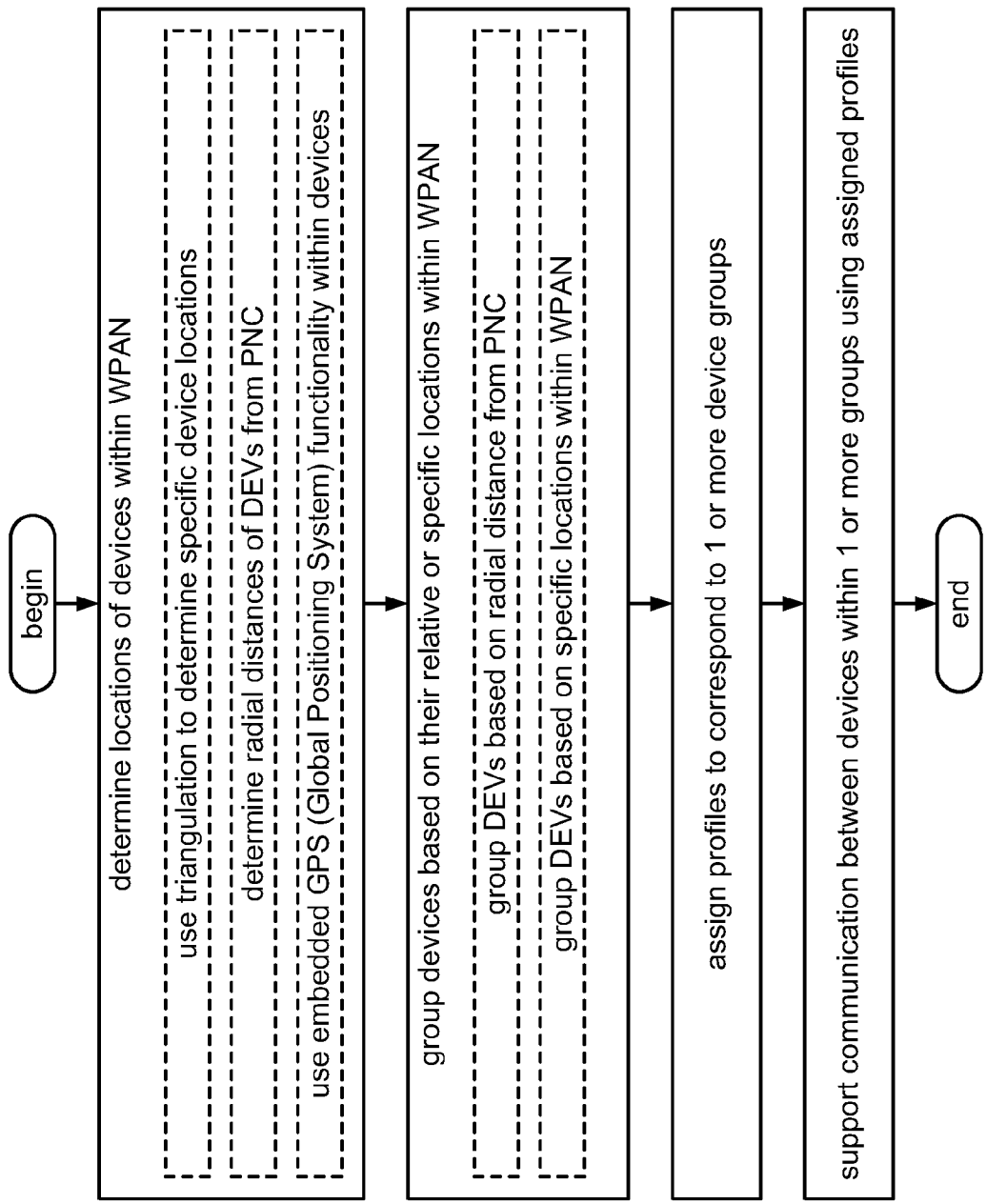
Figure 15:
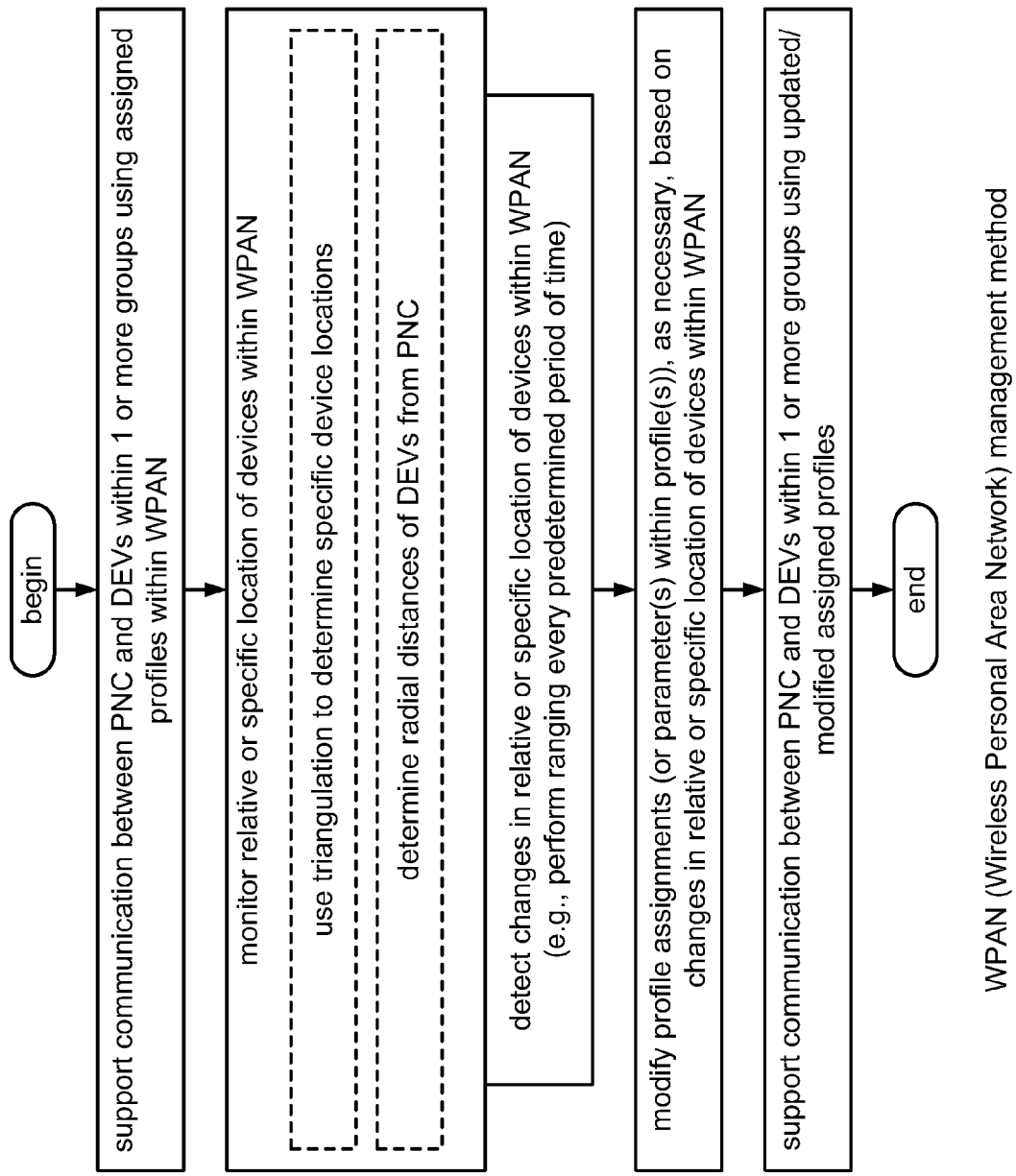

FIG. 14, FIG. 15, and FIG. 16 are flowcharts illustrating various embodiments of WPAN (Wireless Personal Area Network) management methods that are performed according to the invention.

Referring to the FIG. 14, the method begins by determining the locations of devices within WPAN. This may involve determining the relative locations of the various devices with respect to one another or the specific locations of the devices. There are a number of ways in which this may be performed. For example, this may be performed by using triangulation to determine specific device locations. Alternatively, this may involve determining the radial distances of various DEVs from a PNC. In even another embodiment, this may involve using embedded GPS (Global Positioning System) functionality within the various devices to determine their specific locations within a certain degree of precision as provided by the GPS functionality.

Then, the method continues by grouping the various devices into a number of groups based on their relative or specific locations within WPAN. For example, this may involve grouping the DEVs into groups based on their radial distance from a PNC. Alternatively, this may involve grouping the DEVs based on their specific locations within the WPAN.

The method then continues by assigning profiles to correspond to the 1 or more device groups into which the devices have been grouped. The method then supports communication between the PNC and the DEVs within the 1 or more groups using the assigned profiles. In addition, this method may also involve supporting communication between the DEVs themselves within the 1 or more groups using their appropriately assigned profiles. This may also involve supporting p2p communication between 2 DEVs using one or more of the assigned profiles as well.

Referring to the FIG. 15, this method begins by supporting communication between a PNC and one or more DEVs within 1 or more groups using profiles that have been assigned within a WPAN. The method continues by monitoring the relative or specific location of devices within WPAN. This may involve using triangulation to determine specific device locations. Alternatively, this may involve determining the radial distances of the various DEVs from a PNC.

The method then continues on by detecting changes in the relative or specific location of devices within WPAN; this may be achieved by performing ranging after the elapse of every predetermined period of time.

Then, the method involves modifying the profile assignments (or parameter(s) within profile(s)), as necessary, based on any changes in the relative or specific location of devices within WPAN. The method then continues by supporting communication between a PNC and one or more DEVs within 1 or more groups using updated/modified assigned profiles. Again, this may also involve employing the PNC to set up p2p communication between 2 DEVs.

Referring to the FIG. 16, initially, the method may follow one of two possible paths. Along one path, the method uses triangulation to determine the specific locations of the devices within the WPAN. Alternatively, the method may employ use GPS (Global Positioning System) functionality within the devices to determine the specific locations of the devices within WPAN.

Regardless of which manner is used to determine the specific location of the devices within the WPAN, the method then involves communicating the location information from all of the DEV(s) within the WPAN to the PNC(s).

The method then involves waiting, using a PNC, for a request of communication between 2 DEVs; alternatively the method involves directing communication between the 2 DEVs unilaterally using the PNC.

Then, in a decision block, the method determines whether there are 2 DEVs that are within a predetermined distance of one another. If these 2 DEVs are within such a predetermined distance, then the method continues by setting up p2p communication between 2 DEVs using the PNC and also using a first profile (e.g., a profile 1). However, if these 2 DEVs are not within the predetermined distance of one another, then the method continues by support communication between 2 DEVs using the PNC and also using a second profile (e.g., a profile 2). If desired, this may involve operating the PNC as a repeater of the communication link between 2 DEVs; this may be performed when the 2 DEVs are supporting p2p communication between them.

It is also noted that the various methods described here within the FIG. 14, FIG. 15, and FIG. 16 may also be performed within the appropriate device and/or system embodiments described within other portions of this specification.

In certain embodiments, various aspects of the invention can be found in a WPAN (Wireless Personal Area Network). The WPAN includes a PNC (piconet coordinator) and a plurality of DEVs (user piconet devices). The PNC transmits UWB (Ultra Wide Band) pulses to each DEV within the plurality of DEVs. After receiving its respective UWB pulse, each DEV within the plurality of DEVs transmits a UWB pulse back to the PNC. The PNC performs ranging of the relative position of each DEV within the plurality of DEVs using the time duration of round trip time of the transmitted UWB pulse and the received UWB pulse thereby determining the relative distance between the PNC and each DEV within the plurality of DEVs. Then, based on the ranging of each DEV of the plurality of DEVs, the PNC groups the plurality of DEVs into at least two groups and identifies a corresponding profile for each group. The profile of each group governs the communication between the DEVs of that group and the PNC (and also may govern the communication between the DEVs of that group).

In certain embodiments, the WPAN includes two different piconets (e.g., a first piconet and a second piconet) that are supported using two different PNCs. In such embodiments, both of the PNCs perform ranging of all of the DEVs within the WPAN. Then, using the ranging information, the two PNCs operate cooperatively to group each of the DEVs into groups that may be serviced by each of the PNCs.

In even other embodiments, the PNC sets up p2p (peer to peer) communication between two DEVs. The PNC identifies a corresponding p2p profile to govern communication between the two DEVs that communicate using p2p communication. The p2p profile includes at least one of a data rate, a modulation density, a code having a code rate, and a TFC (time frequency code). The PNC may operate as a repeater for the p2p communication between the two DEVs.

It is also noted that any one of the profiles may include any one or more of a data rate, a modulation density, a code having a code rate, and a TFC.

The groups into which the DEVs are grouped may be into at least two groups of devices such that the devices of one group are closer to the PNC than the devices of another group. The first group employs a first profile that governs the communication between the DEVs of the first group and the PNC using at least one of a first data rate, a first modulation density, a first code having a first code rate, and a first TFC. The second group employs a second profile that governs the communication between the DEVs of the second group and the PNC using at least one of a second data rate, a second modulation density, a second code having a second code rate, and a second TFC. In some instances, the first data rate is greater than the second data rate. Moreover, the first modulation density may be of a higher order than the second modulation density. In addition, the first code rate may be higher than the second code rate.

The PNC may perform ranging of the position of each DEV within the plurality of DEVs after every elapse of a predetermined period of time. In other words, the PNC may repeatedly perform ranging of the DEVs every n seconds (where n is selectable).

The invention is also operable to accommodate changing of the positions of the devices within the WPAN. The profiles used to govern the communication between the various devices may be modified based on the change in position of any one or more of the devices within the WPAN. In addition, in an effort to ascertain more specific location information of the various devices within the WPAN, triangulation may be employed using 3 devices. If desired, profile assignment may be performed for the various devices based on the specific locations of the devices in some embodiment (as opposed to simply according to the group with which the device is associated).

The UWB pulses may be generated using portions of a UWB frequency spectrum that spans from approximately 3.1 GHz (Giga-Hertz) to approximately 10.6 GHz. The UWB frequency spectrum may be divided into a plurality of frequency bands, and each frequency band of the plurality of frequency bands has a bandwidth of approximately 500 MHz (Mega-Hertz).

There are also a number of other embodiments in which the position based WPAN management may be performed. For example, each of the devices may be implemented such that they include GPS (Global Positioning System) functionality that allows for determination of the specific locations of the devices. This GPS information may be communicated between the devices every n seconds (where n may be programmable). In addition, various methods may be performed according to the invention that support the processing described herein in any number of devices and/or systems.

In view of the above detailed description of the invention and associated drawings, other modifications and variations will now become apparent. It should also be apparent that such other modifications and variations may be effected without departing from the spirit and scope of the invention.

What is claimed is:

1. An apparatus comprising:
   at least one communication interface configured to transmit a first plurality of communication signals to a plurality of communication devices, each of the first plurality of communication signals corresponds to one of the plurality of communication devices, and to receive a second plurality of communication signals from the plurality of communication devices, each of the second plurality of communication signals corresponds to one of the plurality of communication devices; and wherein:
   the apparatus configured to determine relative position of each of the plurality of communication devices to the apparatus using at least one of the first plurality of communication signals and the second plurality of communication signals;
   based on the relative position of each of the plurality of communication devices, the apparatus configured to employ a first profile to govern communication with a first communication device of the plurality of communication devices and to employ a second profile to govern communication with a second communication device of the plurality of communication devices;

the first profile includes at least one of a first data rate, a first modulation, a first code having a first code rate, and a first time frequency code (TFC); and the second profile includes at least one of a second data rate, a second modulation, a second code having a second code rate, and a second TFC.

2. The apparatus of claim 1 further comprising:
the apparatus configured to determine the relative position of each of the plurality of communication devices using at least one time duration of at least one round trip corresponding to at least one of the first plurality of communication signals and at least one of the second plurality of communication signals.

3. The apparatus of claim 1, further comprising:
the apparatus to configured monitor the relative position of the second communication device and a third communication device of the plurality of communication devices; and
based on a change in position of at least one of the second communication device and the third communication device, the apparatus configured to employ a third profile for communication between the apparatus and the second communication device or for communication between the apparatus and the third communication device.

4. The apparatus of claim 1, further comprising:
the apparatus configured to monitor the relative position of the second communication device; and
based on a change in position of the second communication device, the apparatus configured to employ the first profile for communication with the second communication device.

5. The apparatus of claim 1, wherein the first modulation includes a quadrature amplitude modulation (QAM) constellation, and the second modulation includes a phase shift key (PSK) constellation.

6. The apparatus of claim 1, wherein the first modulation includes more constellation points than the second modulation.

7. The apparatus of claim 1, wherein the first plurality of communication signals includes a first plurality of Ultra Wide Band (UWB) pulses, and the second plurality of communication signals includes a second plurality of UWB pulses.

8. The apparatus of claim 1, wherein:
at least one communication device of the plurality of communication devices includes Global Positioning System (GPS) functionality configured to determine a specific location of the at least one of the plurality of communication devices; and
at least one of the second plurality of communication signals includes information for use in determining the specific location of the at least one of the plurality of communication devices as determined by the GPS functionality.

9. The apparatus of claim 1 further comprising:
a piconet coordinator (PNC), wherein the plurality of communication devices includes a plurality of user piconet devices (DEVs).

10. The apparatus of claim 1 further comprising:
a first piconet coordinator (PNC), wherein at least one of the plurality of communication devices is a second PNC.

11. The apparatus of claim 1, wherein a first group of communication devices that includes the first of the plurality of communication devices is located relatively closer to the apparatus than a second group of communication devices that includes the second communication device.

12. An apparatus comprising:
at least one communication interface configured to transmit a first plurality of communication signals to a plurality of communication devices, each of the first plurality of communication signals corresponds to one of the plurality of communication devices, and to receive a second plurality of communication signals from the plurality of communication devices, each of the second plurality of communication signals corresponds to one of the plurality of communication devices; and wherein:
the apparatus to configured determine relative position of each of the plurality of communication devices using at least one of the first plurality of communication signals and the second plurality of communication signals; and
based on the relative position of each of the plurality of communication devices, the apparatus configured to employ a first parameter for communication with a first communication device of the plurality of communication devices and to employ a second parameter for communication with a second communication device of the plurality of communication devices;
based on a change in position of the first communication device, the apparatus configured to employ a third parameter for communication with the first communication device; and
based on a change in position of the second communication device, the apparatus configured to employ a fourth parameter for communication with the second communication device.

13. The apparatus of claim 12, further comprising:
the apparatus configured to determine the relative position of each of the plurality of communication devices using at least one time duration of at least one round trip corresponding to at least one of the first plurality of communication signals and a at least one of the second plurality of communication signals.

14. The apparatus of claim 12, further comprising:
the apparatus configured to monitor the relative position of the first and the second communication device to detect the change in position of the first and the second communication device.

15. The apparatus of claim 12, wherein the first parameter is included within a first profile that includes a first data rate, a first modulation density, a first code having a first code rate, and a first time frequency code (TFC), and the second parameter is included within a second profile that includes a second data rate, a second modulation density, a second code having a second code rate, and a second TFC.

16. The apparatus of claim 12, wherein the first plurality of communication signals includes a first plurality of Ultra Wide Band (UWB) pulses, and the second plurality of communication signals includes a second plurality of UWB pulses.

17. The apparatus of claim 12, wherein at least one of the plurality of communication devices includes Global Positioning System (GPS) functionality to determine a specific location of the at least one of the plurality of communication devices, and at least one of the second plurality of communication signals includes information corresponding to the specific location of the at least one of the plurality of communication devices as determined by the GPS functionality.

18. The apparatus of claim 12, wherein a first group of communication devices that includes the first communication device is located relatively closer to the apparatus than a second group of communication devices that includes the second communication device.

19. A method, comprising:
operating a first communication device to determine relative position of a second communication device and a third communication device to the first communication device;
based on the relative position of the second communication device, employing a first profile for communication between the first communication device and the second communication device; and
based on the relative position of the third communication device, employing a second profile for communication between the first communication device and the third communication device, wherein the first profile includes at least one of a first data rate, a first modulation density, a first code having a first code rate, and a first time frequency code (TFC); and the second profile includes at least one of a second data rate, a second modulation density, a second code having a second code rate, and a second TFC.

20. The method of claim 19, further comprising:
transmitting a first transmit communication signal from the first communication device to the second communication device;
transmitting a second transmit communication signal from the first communication device to the third communication device;
within the first communication device, receiving a first receive communication signal from the second communication device;
within the first communication device, receiving a second receive communication signal from the third communication device;
determining the relative position of the second communication device using a respective time duration of a round trip corresponding to the first transmit communication signal and the first receive communication signal; and
determining the relative position of the third communication device using a respective time duration of a round trip corresponding to the second transmit communication signal and the second receive communication signal.

21. The method of claim 20, wherein the first transmit communication signal includes a first Ultra Wide Band (UWB) pulse, and the first receive communication signal includes a second UWB pulse.

22. The method of claim 19, further comprising:
monitoring the relative position of the second communication device and the third communication device; and
based on a change in position of at least one of the second communication device and the third communication device, employing a third profile for communication between the first communication device and the second communication device or for communication between the first communication device and the third communication device.

23. The method of claim 19, wherein the first profile includes a first forward error correction (FEC) code; and the second profile includes a second FEC code.

24. The method of claim 19, wherein the first modulation density is of a higher order than the second modulation density.

25. The method of claim 19, further comprising:
employing Global Positioning System (GPS) functionality within at least one of the second communication device and the third communication device for determining a specific location of the at least one of the second communication device and the third communication device; and
from the at least one of the second communication device and the third communication device, transmitting information corresponding to the specific location of the at least one of the second communication device and the third communication device.

26. The method of claim 19, wherein the first communication device is a piconet coordinator (PNC), and the second communication device and the third communication device are user piconet devices (DEVs).

27. The method of claim 19, wherein the first communication device is a first piconet coordinator (PNC), and at least one of the second communication device and the third communication device is a second PNC.

28. The method of claim 19, wherein a first group of communication devices that includes the second communication device is located relatively closer to the first communication device than a second group of communication devices that includes the third communication device.

* * * * *

UNITED STATES PATENT AND TRADEMARK OFFICE
CERTIFICATE OF CORRECTION

| | | |
|---|---|---|
| PATENT NO. | : 8,774,070 B2 | Page 1 of 1 |
| APPLICATION NO. | : 12/694863 | |
| DATED | : July 8, 2014 | |
| INVENTOR(S) | : Jeyhan Karaoguz | |

It is certified that error appears in the above-identified patent and that said Letters Patent is hereby corrected as shown below:

In the Claims:

Col. 17, line 19, in claim 3: after "the apparatus" replace "to configured" with --configured to--
Col. 18, line 14, in claim 12: after "the apparatus" replace "to configured" with --configured to--
Col. 18, line 39, in claim 13: after "communication signals" replace "and a at least one of the second" with --and at least one of the second--

Signed and Sealed this
Nineteenth Day of May, 2015

Michelle K. Lee
*Director of the United States Patent and Trademark Office*